US007085431B2

(12) United States Patent
Jones et al.

(10) Patent No.: US 7,085,431 B2
(45) Date of Patent: Aug. 1, 2006

(54) SYSTEMS AND METHODS FOR REDUCING POSITION ERRORS IN IMAGE CORRELATION SYSTEMS DURING INTRA-REFERENCE-IMAGE DISPLACEMENTS

(75) Inventors: Benjamin K. Jones, Seattle, WA (US); Michael Nahum, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 602 days.

(21) Appl. No.: 09/987,162

(22) Filed: Nov. 13, 2001

(65) Prior Publication Data
US 2003/0090681 A1 May 15, 2003

(51) Int. Cl.
*G06K 9/64* (2006.01)

(52) U.S. Cl. ..................... 382/278; 382/293

(58) Field of Classification Search ............... 382/145, 382/147, 149, 151, 218, 219, 300, 278, 266, 382/289, 291, 293; 358/3.26, 3.27, 1.12, 358/3.23, 525, 1.2; 708/422, 426
See application file for complete search history.

(56) References Cited

U.S. PATENT DOCUMENTS

| 5,608,453 A * | 3/1997 | Gerber et al. ............. 348/87 |
| 5,610,823 A * | 3/1997 | Gregory ................... 700/173 |
| 5,754,226 A * | 5/1998 | Yamada et al. ........... 348/219.1 |
| 5,793,430 A * | 8/1998 | Hackett et al. ........... 348/416.1 |
| 6,134,271 A * | 10/2000 | Nakaya et al. ......... 375/240.16 |
| 6,385,245 B1 * | 5/2002 | De Haan et al. ........ 375/240.16 |
| 6,483,538 B1 * | 11/2002 | Hu ........................... 348/180 |
| 6,517,486 B1 * | 2/2003 | Li ............................. 600/443 |
| 6,687,013 B1 * | 2/2004 | Isshiki et al. ............. 356/498 |

FOREIGN PATENT DOCUMENTS

| EP | 0 347 912 | 12/1989 |
| JP | A 05-018714 | 1/1993 |
| WO | WO 92/01923 | 3/1991 |

* cited by examiner

*Primary Examiner*—Daniel Mariam
(74) *Attorney, Agent, or Firm*—Oliff & Berridge, PLC

(57) ABSTRACT

A position error correcting, or reducing, method and system used in an image-correlation system which obtains an error function generally reflecting an error occurring over a nominal reference image update length and an error occurring at a first frequency and various other system errors. The error can be compared to a first reference to fit the position error. In various embodiments, parameters of an error function can be varied in fitting the error function to the first reference. The obtained error function can then be used to determine the position error and render more accurate the image correlation system. In one exemplary implementation, the first frequency is related to a pixel pitch and the nominal reference image update length related to the distance between reference image changes is the maximum usable reference image update length.

30 Claims, 13 Drawing Sheets

SYSTEMS AND METHODS FOR REDUCING POSITION ERRORS IN IMAGE CORRELATION SYSTEMS DURING INTRA-REFERENCE-IMAGE DISPLACEMENTS

BACKGROUND OF THE INVENTION

1. Field of Invention

This invention is directed to image correlation systems.

2. Description of Related Art

Various known devices use images acquired by a sensor array, and correlation between the images acquired by the sensor array, to determine deformations and/or displacements. For example, one class of such devices is based on acquiring a speckle image generated by illuminating an optically rough surface with a light source. Generally, the light source is a coherent light source, such as a laser-generating light source. Such laser-generating light sources include a laser, a laser diode, and the like. After the optically rough surface is illuminated by the light source, the light scattered from the optically rough surface is imaged onto an optical sensor. The optical sensor can be a charge-couple device (CCD), or a semi-conductor image sensor array, such as a CMOS image sensor array or the like.

Prior to displacing or deforming the optically rough surface, a first or reference speckle image is captured and stored. Then, after displacing or deforming the optically rough surface, a second or subsequent speckle image is captured and stored. The reference and second speckle images are then compared on a pixel-by-pixel basis. In general, a plurality of comparisons is performed. In each comparison, the reference and second speckle images are offset, or spatially translated, relative to each other. Between each comparison, the amount of offset, or spatial translation, is increased by a known amount, such as one image element, pixel, or an integer number of image elements or pixels.

In each comparison, the image value of a particular pixel in the reference image is multiplied by, or subtracted from, the image value of the corresponding second image pixel, where the corresponding second image pixel is determined based on the amount of offset. The value resulting from each pixel-by-pixel operation is accumulated to determine a correlation value for that comparison between the reference and second images. That correlation value is then, in effect, plotted against the offset amount, or spatial translation position, for that comparison to determine a correlation function value point. The offset having the greatest correlation between the reference and first images will generate a peak, or a trough, depending on how the pixel-by-pixel comparison is performed, in the plot of correlation function value points. The offset amount corresponding to the peak or trough represents the amount of displacement or deformation between the reference and second speckle images.

In image correlation systems where sub-pixel resolution and accuracy is needed, the sub-pixel resolution is obtained by sub-pixel interpolation. In known laboratory-type systems, sub-pixel interpolation is conventionally performed by fitting a continuous function to the discrete pixel-by-pixel points of a conventional cross-correlation function, locating the extremum, or peak, of the fitted function with sub-pixel resolution, and assuming the extremum or peak, location is the best estimate of the true offset between the reference and second images, and thus of the associated displacement. It is also known to apply a similar procedure to synthetic images that are created at sub-pixel steps by interpolating between the adjacent raw pixel values to create synthetic pixel values, as though an image were taken with the pixels located at the desired sub-pixel location.

In conventional image correlation systems and high-accuracy laboratory systems where sub-pixel resolution is needed, systematic displacement errors within a sub-pixel are introduced when determining a displacement to a sub-pixel resolution between a reference image and a second image. For example, systematic displacement errors caused by an interpolation method used in a cross-correlation algorithm can be introduced into the sub-pixel image correlation. Systematic errors in determining the displacement can be influenced by many factors, such as the frequency content of the speckle pattern, amplitude attenuation and the phase error of the interpolator used in the correlation. Systematic errors in determining the displacement can also be influenced by the type of interpolation function used to model the correlation function, such as linear, quadratic, Gaussian, etc.

U.S. patent application Ser. No. 09/731,671, which is expressly incorporated herein by reference in its entirety and for all purposes, discloses systems and methods for high accuracy displacement determination in a correlation-based position transducer. The 671 application discloses systems and methods that estimate the sub-pixel displacement of images in correlation-based position transducers and the like. These systems and methods then reject the systematic displacement estimation errors present when conventional sub-pixel estimation methods are applied to a number of correlation function value points, especially when the correlation function value points are arranged asymmetrically.

U.S. patent application Ser. No. 09/860,636, which is expressly incorporated herein by reference in its entirety and for all purposes, discloses systems and methods that reduce accumulated systematic errors in an image correlation system. In the 636 application, systems and methods are provided that reduce accumulated systematic errors in a sub-pixel displacement of images in an image correlation-based position transducers and the like. However, the systems and methods disclosed in the 636 application do not compensate position errors in image correlation systems that are due to uncollimated light sources, or optical distortions, or both.

SUMMARY OF THE INVENTION

In addition to the systematic displacement errors, the inventors have determined that image correlation systems and high-accuracy laboratory systems where sub-pixel resolution is needed suffer from position errors that arise due to uncollimated light sources, or optical distortions, or both. For example, the systems and methods disclosed in the 671 application do not compensate position errors in image correlation systems that are due to uncollimated light sources, or optical distortions, or both. Similarly, the systems and methods disclosed in the 636 application do not compensate position errors in image correlation systems that are due to uncollimated light sources, or optical distortions, or both.

The inventors have discovered that, in conventional image correlation systems, intra-reference-image position errors are introduced when determining a displacement position, wherein the displacement errors depend on the displacement between a reference image and a second image. That is, intra-reference-image position errors are errors that occur over a range of displacements that do not require the reference image to be changed.

The inventors have also found, in various exemplary image correlation systems, that intra-reference-image displacement errors can occur due to uncollimated light sources and/or optical distortions. The inventors have found that such intra-reference-image errors detrimentally affect the accuracy of image correlation systems when the position of the second image is displaced by more than a few pixels from the reference image position. Consequently, unless reference image positions are switched every few pixels, the accuracy of image correlation systems suffers due to these position errors. On the other hand, frequently switching reference image positions to avoid such position errors may detrimentally affect system memory requirements and the speed with which the measurements can be made. This can also increase the errors that accumulate when switching reference images, as discussed in the 636 application.

In both conventional image correlation devices and laboratory systems that use image correlation in high-accuracy positioning and the like, the practical problems from position errors that occur due to uncollimated light sources and optical distortions have not been adequately considered.

In particular, these conventional devices and high-accuracy laboratory systems and the like have given insufficient consideration to reducing or correcting for the position errors that arise due to uncollimated light sources and/or optical distortions. That is, these conventional devices and high-accuracy laboratory systems and the like have given insufficient consideration to the position errors that might occur due to uncollimated light sources and/or optical distortions when the displacement exceeds a few pixel pitches. These position errors, and other such intra-reference-image position errors, are characteristic of a particular system design and/or construction. Thus, for a particular system design and/or construction, such errors may be characterized in relation to displacements relative to an unspecified or arbitrary reference image position. Thereafter, displacements relative to any reference image position may be compensated for or corrected based on that characterization.

This invention separately provides systems and methods for reducing the intra-reference-image errors that are related to the displacement between a reference image and a second image.

This invention separately provides systems and methods for reducing position errors possibly due to uncollimated light sources and/or optical distortions in an image correlation system.

This invention separately provides systems and methods for reducing the position error.

This invention separately provides systems and methods for reducing the position error in an image correlation displacement sensing system such as a correlation-based position transducer and the like.

This invention separately provides systems and methods that increase the speed of accurate displacement determination by performing calculations in real time.

This invention separately provides systems and methods where reference images need be changed less frequently by reducing, or correcting for, the intra-reference-image position errors that occur due to the displacement between a reference image and a second image.

This invention separately provides systems and methods where reference images need be changed less frequently by reducing, or correcting for, the intra-reference-image position errors that occur due to the displacement between a reference image and a second image, such as arising from uncollimated light sources and/or optical distortions.

This invention separately provides systems and methods where reference images need be changed less frequently by correcting for, or reducing, the position errors due to uncollimated light sources and/or optical distortions.

This invention separately provides systems and methods that are especially suitable for measuring displacement of a surface using speckle images.

The systems and methods according to this invention will be described with respect to sensor "images," where the term "image" is not limited to optical images, but refers more generally to any one-dimensional, two-dimensional or higher-dimensional arranged set of sensor values. Similarly, the term "pixel" as used herein is not limited to optical picture elements, but refers more generally to the granularity of the one-dimensional, two-dimensional or higher-dimensional arranged set of sensor values. It should be appreciated that the term "image" is not limited to entire images but refers more generally to any image portion that includes a one-dimensional, two-dimensional, or higher-dimensional arranged set of sensor values.

The systems and methods according to this invention estimate position errors in intra-reference-image displacements based on a first spatial frequency related to a pixel pitch and a second spatial frequency related to reference image changes.

In various exemplary embodiments of the correlation systems and methods according to this invention, the benefit of approaches to determining various systematic displacement errors, which arise when any known or later-developed image correlation methods are used to determine the displacement between a reference image and a displaced image, or between the current reference image and a new reference image, are retained by reducing, or correcting for, intra-reference-image position errors that occur due to the displacement between the reference image and a second image, such as those that are due to uncollimated light sources and/or optical distortions.

In various other exemplary embodiments of the correlation systems and methods according to this invention, the systems and methods are particularly well-suited for application to speckle images.

In various other exemplary embodiments of the correlation systems and methods according to this invention, the systems and methods are particularly well-suited to reducing accumulated errors in an image correlation with speckle-image type readheads at high speed with high accuracy.

These and other features and advantages of this invention are described in, or are apparent from, the following detailed description of various exemplary embodiments of the systems and methods according to this invention.

BRIEF DESCRIPTION OF THE DRAWINGS

Other aspects and advantages of this invention will become apparent upon reading the following detailed description and accompanying drawings, which are given by way of illustration only, and which are thus not limitative of the present invention, wherein.

DETAILED DESCRIPTION OF EXEMPLARY EMBODIMENTS

Figure 1:
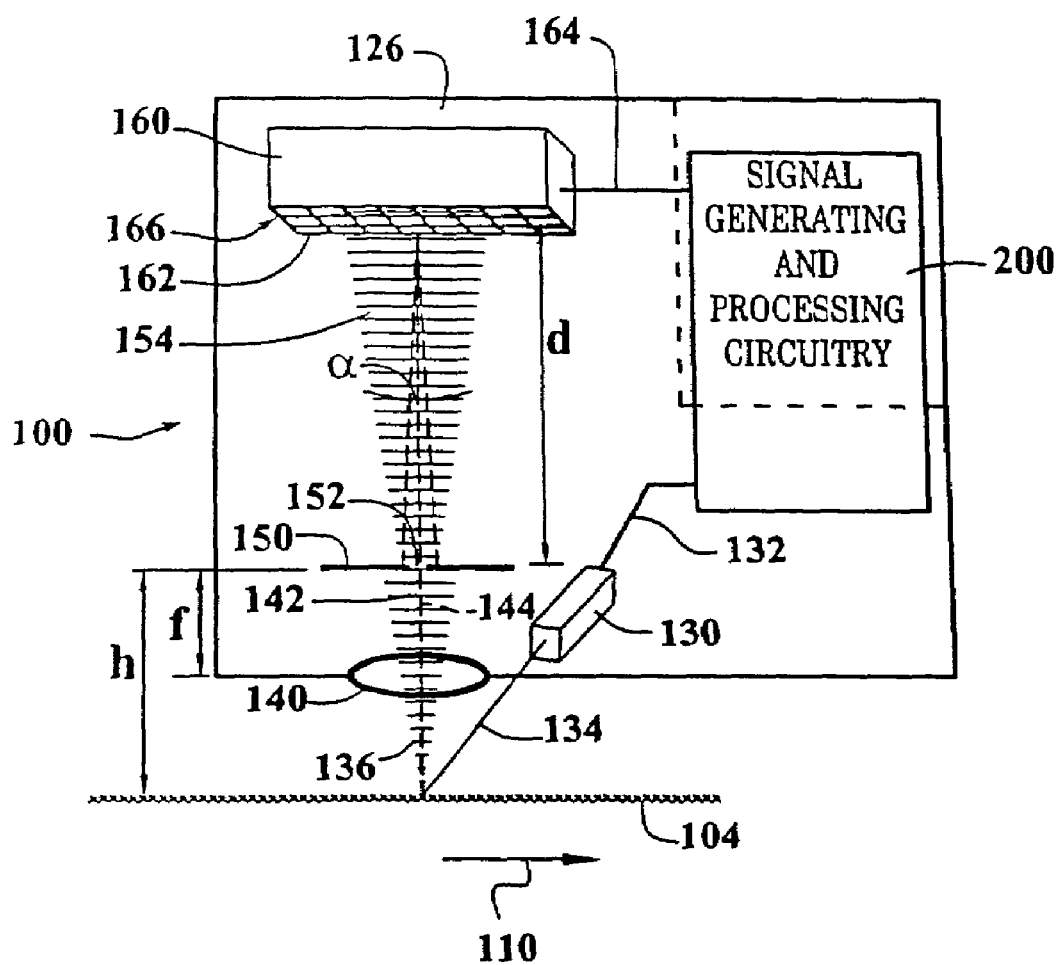
FIG. 1 is a block diagram of a speckle-image-correlation optical position transducer.

FIG. 1 is a block diagram of a speckle-image-based optical position transducer 100. The speckle-image-based optical position transducer 100, as well as various suitable mechanical and optical configurations, image correlation methods, and associated signal processing circuitry, are described in greater detail in co-pending U.S. application Ser. No. 09/584,264, expressly incorporated herein by reference in its entirety and for all purposes.

The speckle-image-based optical position transducer 100 shown in FIG. 1 includes a readhead 126, signal generating and processing circuitry 200 and an optically rough surface 104. In FIG. 1, the components of the readhead 126, and their relation to the optically rough surface 104, are shown schematically in a layout that generally corresponds to an exemplary physical configuration, as further described below.

In particular, the optically diffusing, or optically rough, surface 104 is positioned adjacent to an illuminating and receiving end of the readhead 126, such that when optically rough surface 104 is illuminated by light emitted from that end of the readhead 126 by a light source 130, the emitted light is scattered back from the optically rough surface 104 towards the image receiving optical elements positioned at that end of the readhead 126. The optically rough surface 104 may be part of a specially provided element, or it may be provided as an integral surface of a separately existing mechanism.

In either case, the optically rough surface 104 is positioned at a generally stable distance from the light source and an optical system housed in the readhead 126, and moves relative to readhead 126 along at least one prescribed axis of relative motion, such as a measuring axis 110 shown in FIG. 1. The relative motion is generally constrained by conventional guideways or bearings (not shown) mounted to a frame that maintains the proper relative position between the readhead 126 and the optically rough surface 104. The readhead 126 may include an alignment feature (not shown) which aids in mounting the readhead 126, and aligns the internal components of the readhead 126 relative to the mounting frame and/or the expected axis of relative motion of the optically rough surface 104.

As shown in FIG. 1, the image receiving optical elements of the readhead 126 include a lens 140 positioned at the illuminating and receiving end of the readhead assembly 100 such that the optical axis of the lens 140 is generally aligned with the illuminated spot on the optically rough surface 104. The readhead 126 further includes a pinhole aperture plate 150, spaced apart from the lens 140 along an optical axis, and a light detector 160 spaced apart from the aperture plate 150 along the optical axis, as shown in FIG. 1. The light detector 160 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the optically rough surface 104 and the readhead 126, including the lens 140, the aperture plate 150, and the light detector 160, is further described below and in the incorporated 264 application. The mounting of the light source 130, the lens 140, the aperture plate 150, and the light detector 160 in the housing of the readhead 126 may be done according to conventional methods of miniature optical system construction and/or industrial camera construction, provided that the components are mounted in a precise and stable manner.

When the readhead 126 is suitably positioned adjacent to the optically rough surface 104, each image captured by the light detector 160 will contain a random pattern of relatively bright spots, or speckles, where the diffracted light waves from the optically rough surface 104 combine positively to form an intensity peak, and relatively dark spots where the diffracted light waves from the optically rough surface 104 combine negatively to form an intensity trough. The random pattern corresponding to any illuminated portion of the optically diffusing, or optically rough, surface 104 is unique, and the optically rough surface 104 can therefore act as a displacement reference without the need for any special marks.

The light detector 160 has an array 166 of image elements 162 spaced apart along at least one axis at a known spacing. The known spacing provides the basis for measuring the displacement or offset between two images projected onto the light detector 160, and thus also provides the basis for measuring the displacement of the surface that determines the images, i.e., the optically rough surface 104.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIGS. 12–14.

As shown in FIG. 1, a light beam 134 is emitted by the light source 130 and is directed onto the optically diffusing, or optically rough, surface 104 to illuminate a portion of the optically diffusing, or optically rough, surface 104. As a result, the illuminated portion of the optically diffusing, or optically rough, surface 104 both scatters and diffracts light about the optical axis 144. Additional details regarding the structure and operation of this and other embodiments of the speckle-image-based optical position transducer 100 are provided below, and in the incorporated 264 application.

When the light source 130 is a white-light source, the light emitted by that white-light source will generate an image of the illuminated portion, which can be projected onto the array 166 of the image elements 162. However, while this image can be correlated in the same way that a speckle image can be correlated, this image will not include speckles formed by scattering from the optically diffusing, or optically rough, surface 104.

When the light source 130 is coherent and is driven by the drive signal on the signal line 132 to output the light beam 134 as a coherent light beam, the coherent light beam 134 illuminates a portion of the optically diffusing, or optically rough, surface 104. The illuminated portion lies along the optical axis 144 of the optical system of the readhead 126. In particular, the light 136 scattered from the illuminated portion of the optically diffusing, or optically rough, surface 104 is gathered by the lens 140.

The lens 140 then projects the collected light 142 from the illuminated portion of the optically diffusing, or optically rough, surface 104 onto the pinhole aperture plate 150 having the pinhole aperture 152. The lens 140 is spaced from the plate 150 by a distance f, which is equal to the focal length of the lens 140. The pinhole aperture plate 150 is spaced from the illuminated portion of the optically diffusing, or optically rough, surface 104 by a distance h.

By locating the plate 150 at the focal distance f of the lens 140, the optical system of the speckle-image-based optical position transducer becomes telecentric. Moreover, by using the pinhole 152 in the pinhole plate 150, the speckle size and the dilation of the speckle pattern depends solely on the dimensions of the pinhole 152 and, more particularly, becomes independent of any lens parameters of the lens 140.

The collected light 142 from the lens 140 passes through the pinhole 152. In particular, the light 154 passed by the pinhole 152 is projected along the optical axis 144 and onto the array 166 of the image elements 162 of the light detector 160. The surface of the array 166 of the light sensitive elements 162 is separated from the plate 150 by a distance d. The speckle size depends only on the angle $\alpha$ subtended by the dimensions of the pinhole 152 and the distance d between the pinhole plate 150 and the surface formed by the array 166 of image elements 162 of the light detector 160.

The approximate size D of the speckles within the detected portion of the light received from the illuminated portion of the optically diffusing, or optically rough, surface 104 onto the array 166 of the image elements 162 is:

$$D \approx \lambda/\tan(\alpha) = (\lambda^* d)/w \qquad (1)$$

where:

$\lambda$ is the wavelength of the light beam 134;

d is the distance between the pinhole plate 150 and the surface of the array 166;

w is the diameter of a round pinhole 152; and $\alpha$ is the angle subtended by the dimension w at a radius equal to distance d.

In various exemplary embodiments, typical values for these parameters of the optical position transducer 100 include: $\lambda=0.6$ µm, d=10 cm ($10^5$ µm), and w=1 mm ($10^3$ µm). As a result, the approximate speckle size D is about 60 µm.

To achieve high resolution, the average speckle size is most usefully approximately equal to, or larger than, the pixel size of the image elements 162 of the light detector 160. Moreover, in various embodiments of the readhead 126, the average speckle size is approximately two times to ten times the pixel spacing of the image elements 162.

To acquire an image, the signal generating and processing circuitry 200 outputs a drive signal on the signal line 132 to drive the coherent light source 130 to emit the coherent light beam 134. The light beam 134 illuminates a portion of the optically rough surface 104, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine a displacement of the optically rough surface 104 between any two images, the signal portions for a first image received from the light detector 160 by the signal generating and processing circuitry 200 are stored in memory. A short time later, the signal generating and processing circuitry 200 again drives the coherent light source 130 and inputs a second image signal from the light detector 160 over the signal line 164. Generally, the second image must be generated and acquired within a short time period after the first image is acquired, depending on the displacement speed of the optically rough surface 104. The time period must be short enough to insure that the first and second images "overlap" sufficiently. That is, the time period must be short enough to insure that a pattern of image values present in the first image is also present in the second image, so that a significant correlation between the two images can be determined.

However, in some exemplary embodiments, it may be desirable to store one or more reference images corresponding to a particular position for periods longer than the time period for obtaining the next displaced image. That is, rather than using the current second image as the first image for the next sampled image, a current reference image is repeatedly used for a succession of displaced images. In general, the current reference image can be used until the current reference image and the current displaced image no longer overlap sufficiently to generate a strong correlation peak or trough. In this way, there is no accumulation of position errors between the successive images, as in the prior art technique.

That is, at some point, the current displaced image will reach a relative displacement that indicates that a future displaced image may not sufficiently overlap the current reference image. At that point, a new reference image should be identified and the current reference image should be replaced or updated with the identified new reference image. As described in the incorporated 636 application, the new reference image is selected from at least some of the succession of displaced images obtained since the current reference image was first used, such that the position error that has accumulated due to systematic displacement errors present at switching between the successive reference images is known, reduced or ideally eliminated.

The current reference image and the current displaced image are processed to generate a correlation function. In practice, the current displaced image is shifted digitally relative to the current reference image over a range of offsets, or spatial translation positions, that includes an offset that causes the pattern of the two images to most nearly align. The correlation function indicates the degree of pattern alignment, and thus indicates the amount of offset required to get the two images to align as the images are digitally shifted.

Figure 2:
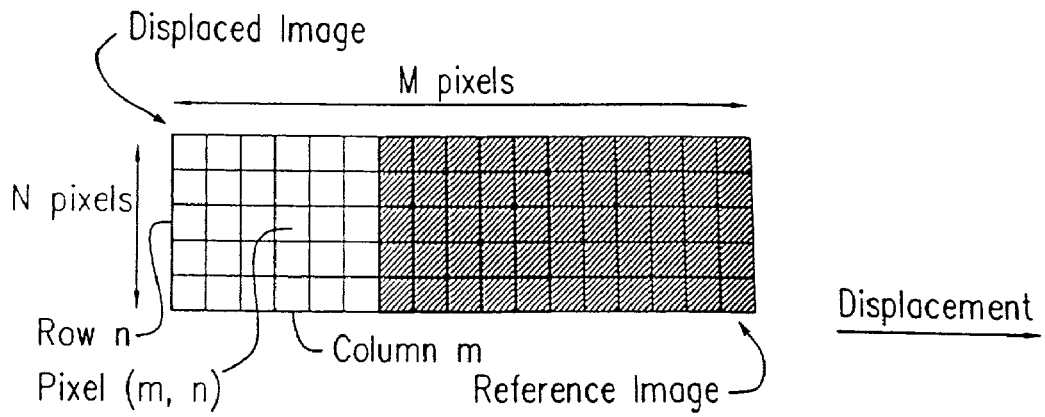
FIG. 2 illustrates the relationship between the current reference and displaced images and the portions of the current reference and displaced images used to generate the correlation values according to a first technique.
Figure 5:
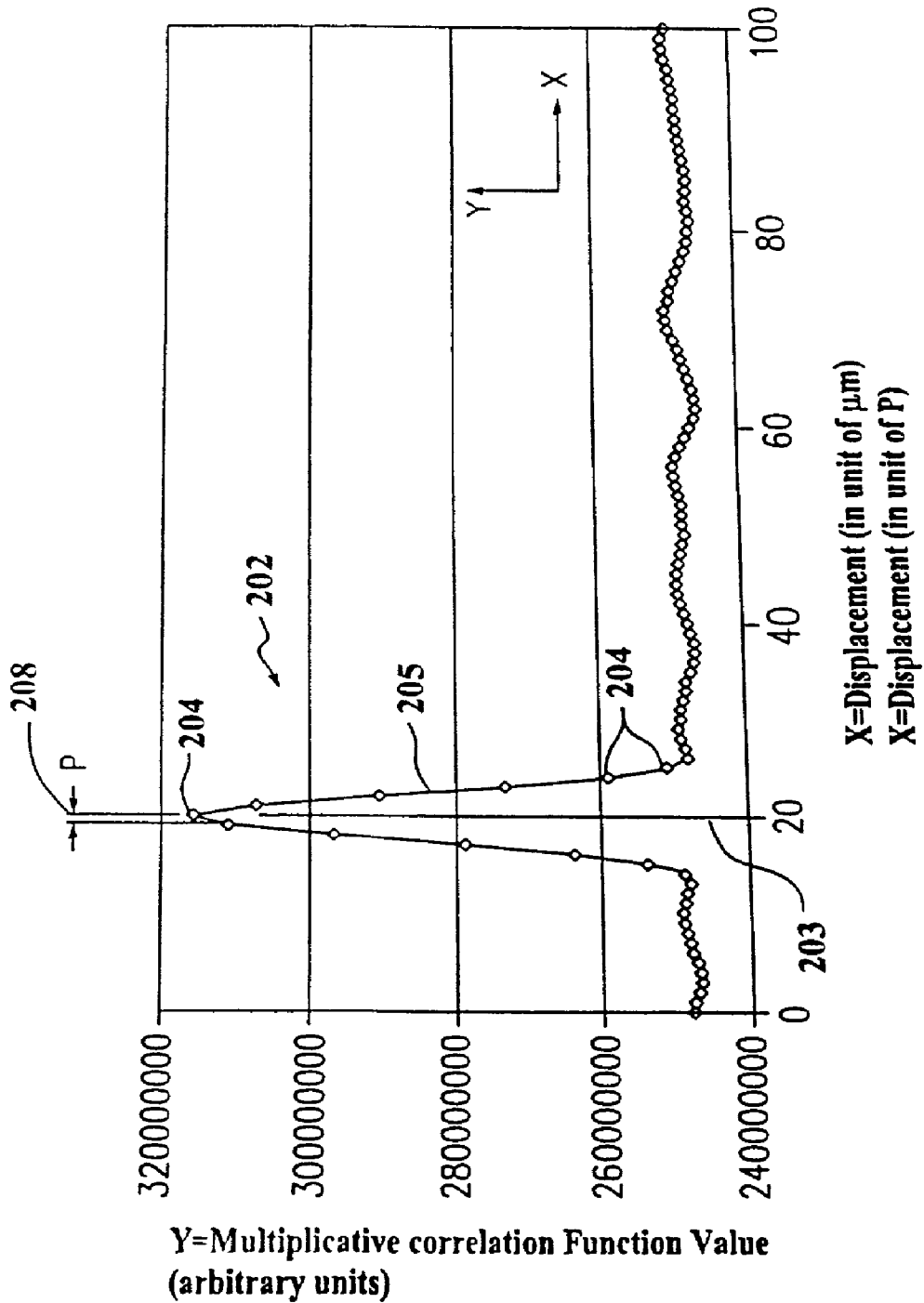
FIG. 5 is a graph illustrating one exemplary embodiment of a correlation function obtained by comparing first and second images by a conventional multiplicative correlation function, when the first and second images are offset at successive pixel displacements.

It should be appreciated that there are a number of different techniques for comparing the current reference image to the current displaced image. For example, as shown in FIG. 2, in a first exemplary technique, the entire frame of the current displaced image is compared on a pixel-by-pixel basis to the entire frame of the current reference image to generate a single correlation value. In this case, those pixels that lie in regions of the current reference and displaced images that do not overlap with a region of the other of the current reference and displaced images are compared to pixels having a default value, or are assigned a default comparison value, or the like. The series of correlation values, such as those shown in FIG. 5, is generated by shifting the current displaced image by one pixel relative to the current reference image after each comparison is performed.

Figure 3:
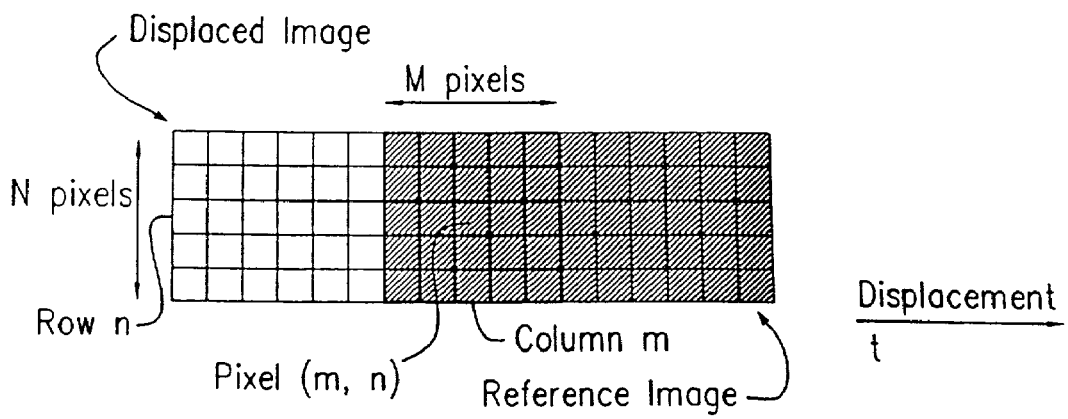
FIG. 3 illustrates the relationship between the current reference and displaced images and the portions of the current reference and displaced images used to generate the correlation values according to a second technique.

In a second exemplary technique, as shown in FIG. 3, the comparison is performed as a two-step process. In a first step, a one or more rows of the current displaced image is compared in full to the one or more corresponding rows of the current reference image to generate an approximate correlation value. A series of approximate correlation values, corresponding to those shown in FIG. 5, is generated by shifting the current displaced image by one pixel relative to the current reference image after each comparison is performed. Because only a small number of rows are compared, each comparison can be quickly generated. However, because only a small number of rows, rather than the entire image, is used, the correlation values obtained only approximate the correlation values that would be obtained from comparing all of the rows of the current displaced image to the corresponding rows of the current reference image. Nonetheless, the approximate correlation values do generally indicated the approximate amount of overlap between the current reference and displaced images.

Then, in the second step, the determined degree of overlap between the current reference and displaced images is used to determine the portion of the current displaced image and the portion of the current reference image that will be compared to generated the correlation values. That is, only the correlation values that are around the correlation peak or trough are used to determine the interpolated sub-pixel displacement. Thus, only the correlation values around the correlation peak or trough need to be determined based on comparing more than a single row or only a few rows of the current displaced and reference images.

In this second step, for each amount of pixel offset between the current reference and displaced images around the approximate correlation peak or trough, only the overlapped regions of the current displaced and reference images are compared against each other on a pixel-by-pixel basis to generate a correlation value for that amount of pixel offset. Thus, for each amount of pixel offset, the size of the compared portions is different than for other amounts of pixel offset. This technique can be further revised to determine correlation function value points for only a sparsely distributed set of offset positions, as disclosed in U.S. patent application Ser. No. 09/921,889, which is expressly incorporated herein by reference in its entirety and for all purposes.

Figure 4:
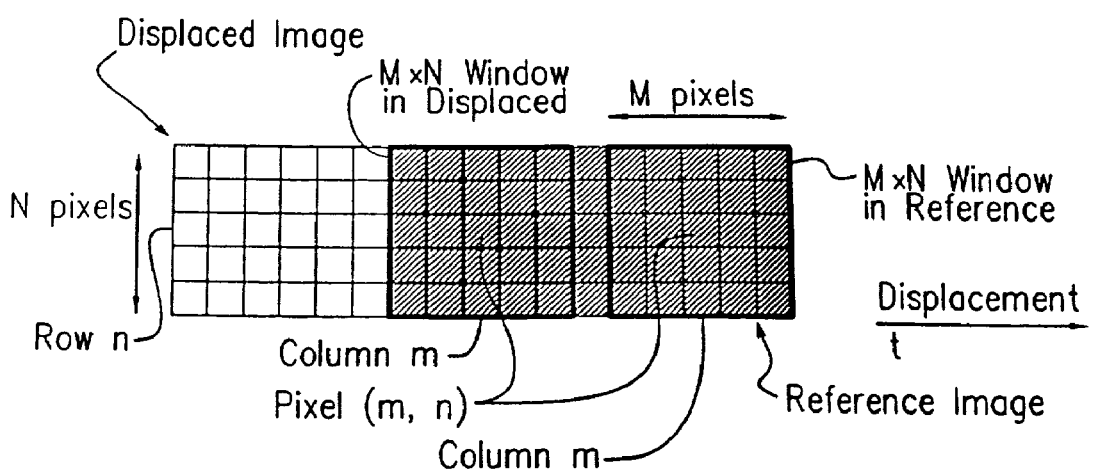
FIG. 4 illustrates the relationship between the current reference and displaced images and the portions of the current reference and displaced images used to generate the correlation values according to a third technique.

In a third exemplary technique, as shown in FIG. 4, a window having a predetermined extent along each direction of motion is used to select a portion of the current displaced image to be compared to the current reference image. In this case, the window is scanned across the current reference image to select a portion of the current reference image to be compared to the selected portion of the current displaced image to generate each correlation value. That is, for an offset value of zero, the window is aligned with one edge of the current reference image. As the offset value increases in pixel increments, the window is moved one pixel toward the opposite edge of the current reference image. The last offset value for which a correlation value is obtained occurs when the window reaches the opposite edge of the current reference image.

For example, in various exemplary embodiments of the third technique, the portion of the current displaced image has an extent along the direction of travel that is approximately ⅓ to ¼ of the frame length L of the current displaced image. This portion can be centered on the geometric center of the current displaced image. It should be appreciated that the window can have a fixed extent or can have an extent that varies based on a previously determined amount of displacement between the current reference and displaced images. In various exemplary embodiments, the size of the window can be selected, at least in part, to minimize the number of pixels that must be compared, while simultaneously ensuring that a strong correlation peak/trough will be obtained.

It should also be appreciated that, in various other exemplary embodiments of the third technique, the location of the portion can be based at least in part on the direction of displacement of the current displaced image relative to the current reference image. In this case, if the current displaced image was displaced to the right of the current reference image, the location of the portion of the current reference image would be offset to the left of center. Furthermore, in various other exemplary embodiments, the degree of offset of the portion can be based at least in part on the amount of displacement of the previous displaced image relative to the current reference image. In this way, the entire portion of the current displaced image can be kept within the bounds of the frame of the current reference image while the amount of relative displacement between the current reference and displaced images, before a new reference image must be used, can be increased.

It should be appreciated that, in the second and third exemplary techniques, where only a portion of the current displaced image is compared to a correspondingly sized portion of the current reference image, a stronger correlation peak or trough compared to the background correlation value can be obtained. In this case, the current reference image should be updated when the portion of the current displaced image approaches the edges of the current reference image.

For a one-dimensional displacement, when the compared portions of each of the current reference image and the current displaced image each comprises M×N pixels arranged in a two-dimensional array of M rows of pixels and N columns of pixels, one common correlation algorithm is:

$$R(p) = \left[\sum_{n=1}^{N}\left(\sum_{m=1}^{M} I_1(m, n) * I_2(p + m, n)\right)\right] \quad (2)$$

where:

$R(p)$ is the correlation function value for the current offset value;

p is the current offset value, in pixels;

m is the current column;

n is the current row;

$I_1$ is the image value for the current pixel in the first image; and $I_2$ is the image value for the corresponding pixel in the second image for the current offset value.

For a two-dimensional displacement, Eq. (2) can be modified by those skilled in the art to deal with the second dimension. One such modification is disclosed in the incorporated 889 application.

It should be appreciated that, in various exemplary embodiments, when the entire frame of the current reference image is compared to the entire frame of the current displaced image, cyclical boundary conditions are used. As indicated in Eq. (2), the correlation value for each row is obtained and the row correlation values are summed. The sum is then averaged over the M rows to obtain an average, and noise-reduced, correlation function value point. This averaging is desirable to ensure that the correlation function value points will be stable to roughly the resolution to be obtained by interpolating to determine the correlation function extremum. Thus, to obtain roughly nanometer resolution by interpolating to determine the correlation function extremum when each correlation function value point is offset by approximately 1 μm from adjacent correlation function value points, it is assumed that the correlation function value points need to be stable roughly to the desired nanometer resolution value.

FIG. 5 is a graph illustrating an exemplary correlation function obtained by comparing first and second images according to the previously described conventional multiplicative correlation function method. In particular, the correlation function shown in FIG. 5 includes a plurality of discrete correlation function value points 201 that are separated along the x-axis by a predetermined offset increment corresponding to the pixel pitch P, as indicated by the distance 208. The predetermined offset increment can be directly related to a displacement increment of the optically rough surface 104 shown in FIG. 1. This displacement increment depends upon the effective center-to-center spacing between the individual image elements 162 of the array 166 in the direction corresponding to the measurement axis 110, which is also referred to as the pixel pitch P, in the following description, and the amount of magnification of the displacement of the optically diffusing, or optically rough, surface 104 by the optical system of the readhead 126.

For example, if the effective center-to-center spacing of the image elements 162 in the direction corresponding to the measurement axis 110 is 10 μm, and the optical system of the readhead 126 magnifies the surface displacement by 10×, then a 1 μm displacement of the illuminated portion of the optically diffusing, or optically rough, surface 104 will be magnified into a 10 μm displacement of the speckle pattern on the image elements 162.

Each correlation function value point 201 is generated by digitally shifting the second image relative to the first image by the effective center-to-center spacing of the image elements 162 in the direction corresponding to the measurement axis 110. Because, in this case, the effective center-to-center spacing of the image elements 162 corresponds to about a 1 μm displacement of the optically diffusing, or optically rough, surface 104, the discrete correlation function value points 201 will be separated by a displacement distance of about 1 μm. In particular, the correlation function of FIG. 5, which has correlation function values displayed in arbitrary units, will exhibit an extremum of the true continuous correlation function 205 at the offset value, or spatial translation position, where the image, or intensity, patterns in each of the first and second images best align.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough.

In the example shown in FIG. 5, the extremum of the true continuous correlation function 205 occurs at an offset of approximately 20 pixels or image elements 162, corresponding to a displacement of 20 μm, as indicated by the line 203. In FIG. 5, the extremum of the true continuous correlation function 205 is indistinguishable from the extreme correlation function value point 204. However, in general, the extremum does not necessarily occur at an offset, or spatial translation position, which is an integer multiple of the pixel spacing, and therefore does not precisely coincide with the extreme correlation function value point.

Conventionally, if sub-pixel resolution and accuracy are required, a function f(x) is numerically fit to the correlation function value points which make up the correlation peak 202. Subsequently, the extremum for the numerically fit function f(x) is found and the corresponding offset value, or spatial translation position, is identified as the best estimate of the peak offset for the first and second images. For example, to find the offset value corresponding to the extremum for the numerically fit function f(x), the numerically fit function f(x) is differentiated to determine the offset value x where the slope of f(x) is equal to zero.

When a multiplicative correlation function such as Eq. (2) is used, the correlation function is relatively curved in the region surrounding the peak or trough. Thus, the numerically fit function f(x) is conventionally chosen to be a second-order or higher function. However, the inventors has found that such conventional methods for estimating the correlation function extremum at the sub-pixel level introduce non-negligible systematic displacement errors, such as those illustrated in FIG. 6.

Figure 6:
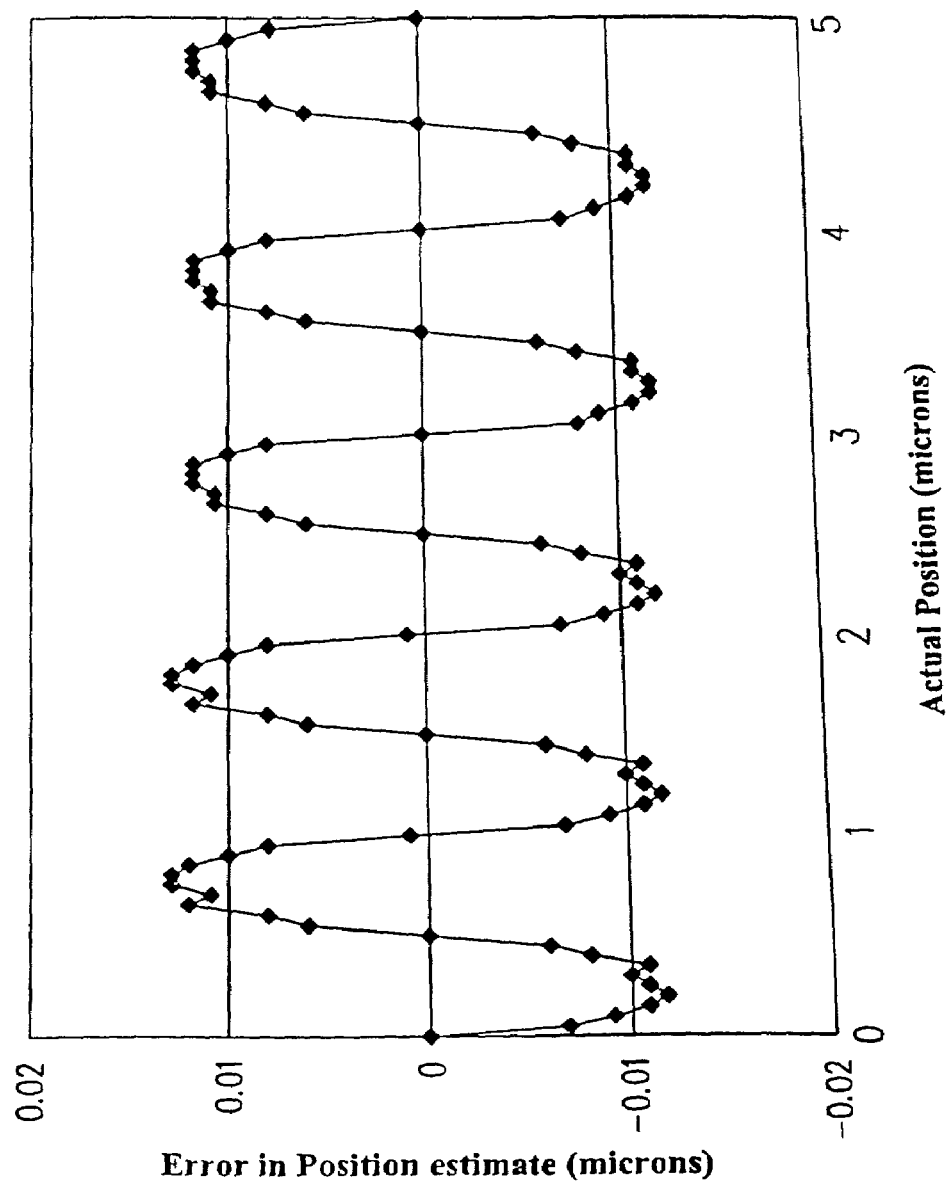
FIG. 6 is a graph illustrating the systematic displacement errors over a series of displacement positions between a reference image and a current displaced image.

FIG. 6 is a graph illustrating the results of comparing first and second images at the sub-pixel level according to the previously described conventional multiplicative correlation function method. In FIG. 6, the error in estimating the position is periodic. The period of the estimation error corresponds to the pitch of a pixel spacing used to acquire the image. The inventors has found that such a periodic error curve is a typical systematic error in sub-pixel image correlation systems. The inventors has also found that this periodicity provides a pre-determined error characteristic which can be used, in various exemplary embodiments of the systems and methods according to this invention, as a basis for reducing or avoiding these systematic displacement errors, even without specifically determining the amplitude or detailed shape of the periodic error curve.

The inventors has furthermore found that such systematic displacement errors are relatively stable for a particular image correlation-based displacement measuring system, and are relatively similar for a plurality of similar image correlation-based displacement measuring systems. Thus, once these systematic displacement errors have been specifically determined for a particular image correlation-based displacement measuring system, such systematic displacement errors reveal at least one pre-determined error characteristic which can provide a basis for specifically compensating for or avoiding these systematic displacement errors during subsequent operation of that particular image correlation-based displacement measuring system. Furthermore, to the extent that a particular image correlation-based displacement measuring system is representative of a class of similar image correlation-based displacement measuring systems, the systematic displacement errors of any machine in that class may be similarly compensated for or avoided, to some extent, based on the pre-determined error characteristic of the particular representative image correlation-based displacement measuring system.

As the current reference image is switched to a new reference image as the readhead 126 is displaced along the optically rough surface 104, systematic displacement errors, such as those shown in FIG. 6, are present in the related measurements. Thus, as one reference image is switched to the next reference image, these systematic displacement errors can accumulate in an unobservable manner unless the systems and methods according to the invention described in the incorporated 636 application are used to reduce such errors or to accumulate such errors in a predictable manner.

The inventors has also found that sub-pixel image correlation systems suffer from additional position errors referred to herein as intra-reference-image position (or displacement) errors. These errors are illustrated on FIGS. 7–10, and in general vary as a complex function of the displacement between the current reference image and the current displaced image. While the full cause of the intra-reference-image position error is not completely understood, the inventors believe that the intra-reference image position error is likely to be due to uncollimated light sources and/or optical distortions in the optical and light source elements of the readhead 126. The inventors has found that such intra-reference-image position errors detrimentally affect the accuracy of image correlation systems when the current displaced image is displaced from the current reference image by more than a few pixels. Consequently, unless the current reference image is replaced with a new reference image every few pixels, as the displacement between the current reference image and the current displaced image increases, the accuracy of image correlation systems suffers due to intra-reference-image position errors. On the other hand, frequently switching reference images to avoid such intra-reference-image position errors detrimentally affects system memory requirements and the speed with which the measurements can be made. This invention presents systems and methods to reduce, or ideally correct for, the intra-reference-image position error and, thus, enhance the accuracy of image correlation systems.

Figure 7:
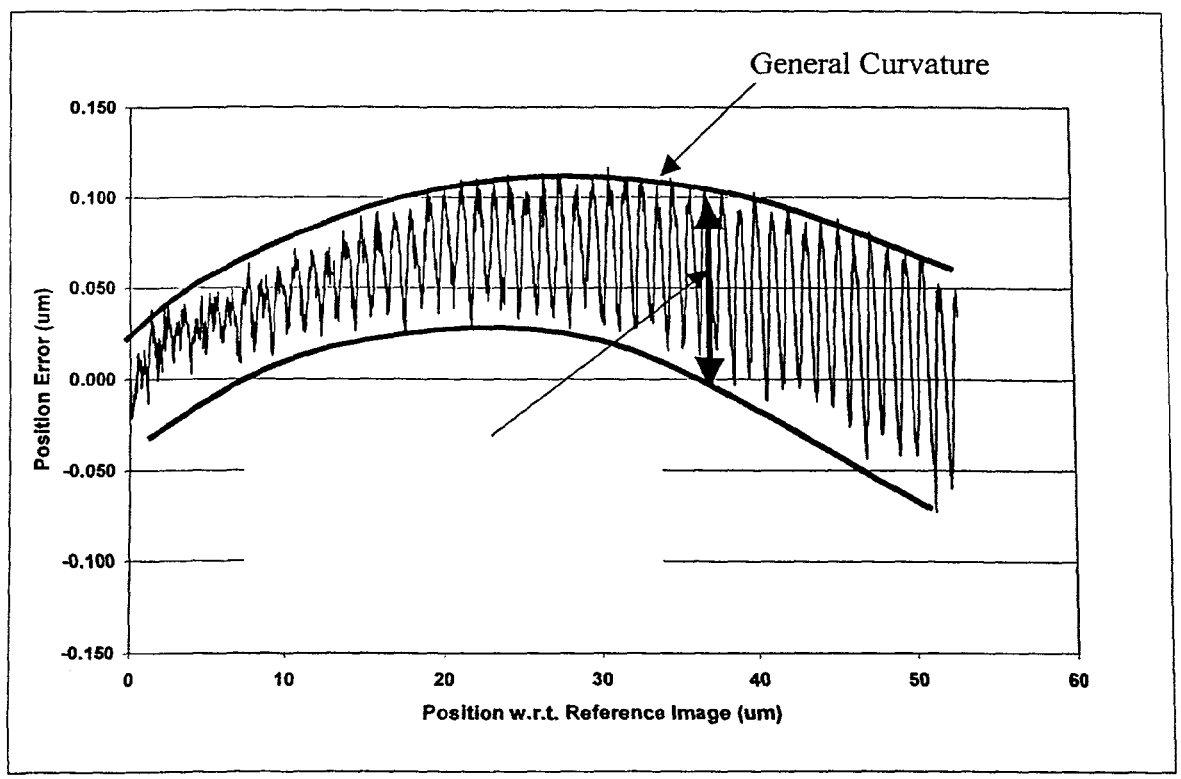
FIG. 7 is a graph illustrating one exemplary embodiment of the typical intra-reference-image position error versus displacement position between a reference image and a current displaced image position in an image correlation measuring system.

FIG. 7 is a graph illustrating typical intra-reference-image position error as a function of the amount of displacement relative to the current reference image, for image correlation measuring systems such as that shown in FIG. 1. The graph of FIG. 7 includes no scale factor error. That is, this graph includes no error that is linearly related to displacement. As indicated above, the intra-reference-image position error is the position error that occurs during the use of a single reference image with displaced images that are increasingly displaced from the reference image. In particular, FIG. 7 illustrates the intra-reference-image position error as a function of the amount of displacement relative to the current reference image, for an image correlation measurement system that uses a laser speckle pattern. The intra-reference-image position error shown in FIG. 7 includes a periodic component that has a peak-to-peak magnitude of about 30 nanometers for a displacement of the current displaced image from the current reference image of only a few micrometers. The peak-to-peak magnitude of the periodic component increases to about 100 nanometers at a displacement of the current displaced image from the current reference image of about 50 μm. This periodic error component occurs due to interpolating the displacement position to a sub-pixel resolution. The inventors believe that the increase in the peak-to-peak magnitude of the intra-reference-image position error could be due to lens distortion and/or image decorrelation. The intra-reference-image position error also shows a general curvature, which the inventors believe could be attributable to imperfect collimation of the light source, lens distortion, and/or image decorrelation. However, it should be appreciated that, regardless of the cause, the shape of the intra-reference-image position error cause can be measured and characterized.

However, while the inventors have been able to measure the intra-reference-image position error, the exact cause or causes of these errors have not been definitely determined. Thus, while the inventors currently believe these errors could be the result of lens distortions, imperfect collimation and/or coherence of the light beam used to illuminate the optically rough surface and/or other optical aberrations, except as expressly noted below and in the claims, these causes should not be interpreted as limiting the scope of the disclosure set forth herein or of the scope of the appended claims.

The intra-reference-image position error curve shown in FIG. 7 may be described by the following generic compensation function:

$$e(x) = f_1(x) f_2(x) + f_3(x) + f_4(x) \quad (3)$$

where:

x is the displaced position of the current displaced image from the current reference image as initially measured by the image correlation system;

e(x) is the position error;

$f_1(x)$ is a function that describes the peak-to-peak magnitude of the periodic interpolation error versus displaced position;

$f_2(x)$ is a periodic function with a frequency and/or shape that corresponds to the frequency and/or shape of the periodic interpolation error;

$f_3(x)$ is a function that describes the general curvature of the intra-reference-image position error curve; and $f_4(x)$ is a linear function that adjusts for scale factor error. In paragraphs, the scale factor error is an error component which is proportional to displacement.

A first exemplary embodiment of a function that implements the generic function described in Eq. (3) is:

$$e(x) = (c_1 + c_2 x) \sin(\omega_1 x + \phi_1) + ABS(c_3 \sin(\omega_2 x/2)) \quad (4)$$

where:

c1, c2 and c3 are empirically-derived parameters;

ω1 is the spatial frequency of the periodic interpolation error;

φ1 is the spatial phase angle of the periodic interpolation error, used to synchronize the periodic error and the compensation function; and ω2 is the spatial frequency of updating the reference image.

It should be appreciated that the term $f_4(x)$ in Eq. (3) has no counterpart in the exemplary embodiment represented by Eq. (4). That is, thus exemplary embodiments represented by Eq. (4) assume that any linear scale factor error has been previously eliminated by other means. In general, the empirically-derived parameters c1, c2 and c3 can be determined by observing and/or analyzing the shape of the intra-reference-image position error curve, such as those shown in FIGS. 7–10 for a particular image-correlation based position transducer. It should be appreciated that, in general, the frequency $\omega_1$ of the periodic interpolation error is related to 2*π/pixel pitch. Similarly, the frequency $\omega_2$ of updating the reference image is related to 2*π/(total displacement between reference image updates).

Figure 8:
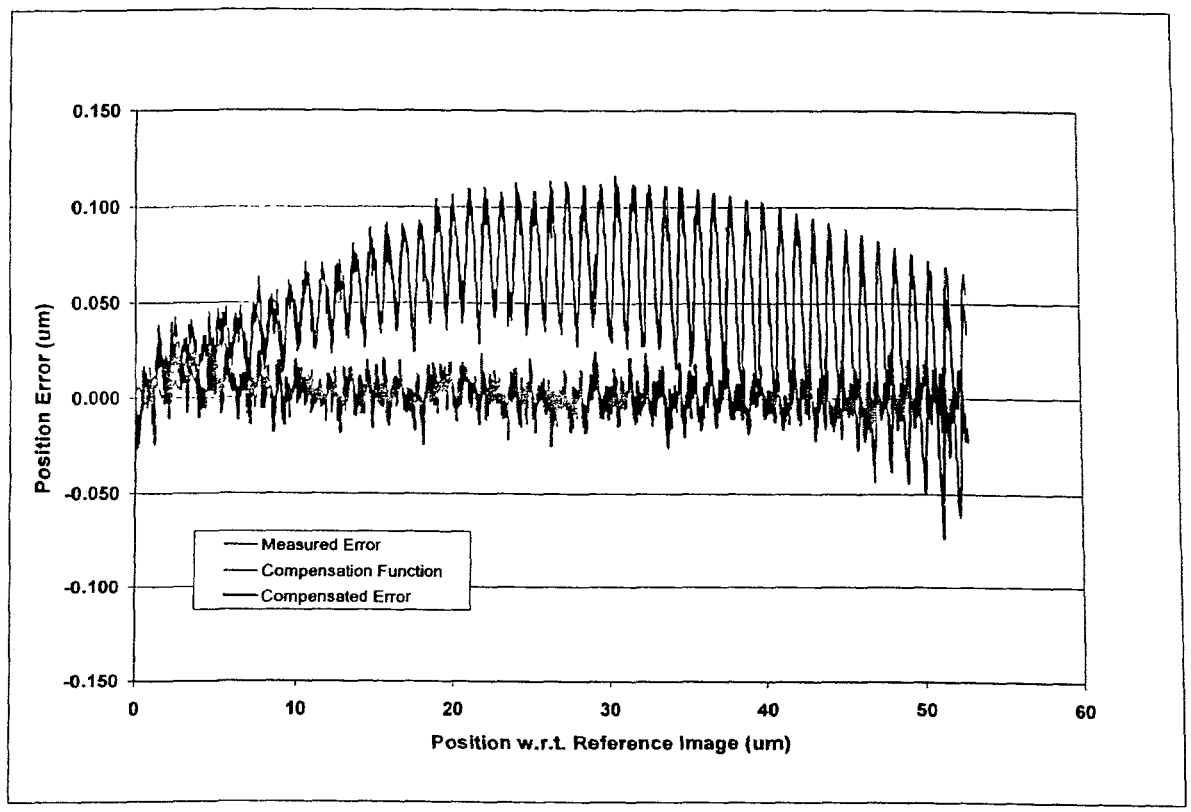
FIG. 8 is a graph illustrating the measured intra-reference-image position error, and the compensated intra-reference-image position error based on a first compensation function, obtained according to one exemplary embodiment of the systems and methods of this invention, for an image correlation measuring system where the reference image is updated at about 52.7 micrometers of displacement.

FIG. 8 shows a plot of the measured intra-reference-image position error, the compensation values for a corresponding error compensation function, which are nearly indistinguishable from the measured error, and the resulting compensated intra-reference-image position error. The plots of FIG. 8 include no scale factor error. That is, the plots shown in FIG. 8 include no error that is linearly related to displacement. The compensated intra-reference-image position error is obtained by subtracting the value of the compensation function from the measured error for a given displacement. In particular, for an image correlation system having a pixel pitch of about 1.05 micrometer and where the displacement that occurs between the current reference image and the current displaced image when the current reference image is replaced with a new reference images is about 52.7 micrometers, a set of values usable in Eq. (4) are:

c1=0.005;
c2=0.055;
c3=0.075;
ω1=5.977;
φ1=0.897; and
ω2=0.119.

As shown in FIG. 8, compensating for the intra-reference-image position error using Eq. (4) enhances the accuracy of the image correlation systems by allowing the correction of, or merely reducing, the intra-reference-image position errors, such as those that might occur due to uncollimated light sources and/or optical distortions, without having to change reference images, for a large displacement between the current reference image and the current displaced image, which is over 50 μm, in the exemplary embodiment illustrated in FIG. 8.

A second exemplary embodiment of a compensation function that implements the generic compensation function described in Eq. (3) is:

$$e(x) = (c_1 + c_2 x) \sin(\omega_1 x + \phi_1) + ABS(c_3 \sin(\omega_2 x/2)) + c_4 \sin(\omega_2 x/4) \quad (5)$$

where:

c1, c2, c3 and c4 are empirically derived parameters;

ω1 is the spatial frequency of the periodic interpolation error;

φ1 is the spatial phase angle of the periodic interpolation error, used to synchronize the periodic error and the compensation function; and ω2 is the spatial frequency of updating the reference image.

In comparison to the exemplary embodiment represented by Eq. (4), the exemplary embodiment represented by Eq. (5) includes an additional term corresponding to the term $f_3(x)$ of Eq. 3, so that the general curvature of the intra-reference-image position error curve can be compensated for with greater precision. In general, the empirically-derived parameters c1, c2, c3 and c4 can be determined by observing the shape of the intra-reference-image position error curve, such as those shown in FIGS. 7–10 for a particular image-correlation based position transducer. It should be appreciated that, in general, the frequency $\omega_1$ of the periodic interpolation error is related to 2* π/pixel pitch. Similarly, the frequency $\omega_2$ of updating the reference image is related to 2* π/(total displacement between reference image updates).

Figure 9:
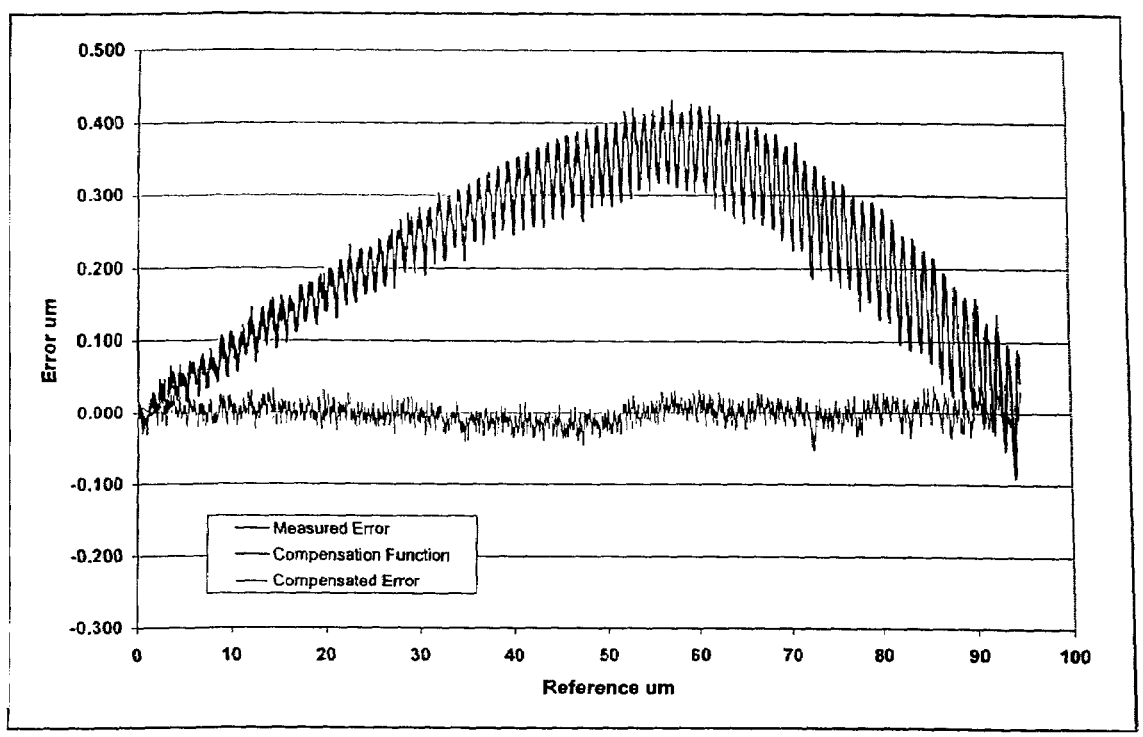
FIG. 9 is a graph illustrating the measured intra-reference-image position error, and the compensated intra-reference-image position error based on a second compensation function, obtained according to one exemplary embodiment of the systems and methods of this invention, for an image correlation measuring system where the reference image is updated at about 94.6 micrometers of displacement.

FIG. 9 shows a plot of the measured intra-reference-image position error, the compensation values for a corresponding error compensation function, which again is nearly indistinguishable from the measured error and the resulting compensated intra-reference-image position error. The plots of FIG. 9 include no scale factor error. That is, the plots shown in FIG. 9 include no error that is linearly related to displacement. The compensated intra-reference-image position error is obtained by subtracting the value of the compensation function from the measured error for a given displacement. In particular, for an image correlation system having a pixel pitch of about 1.05 micrometer and where the displacement that occurs between the current reference image and the current displaced image when the current reference image is replaced with a new reference image is about 94.6 micrometers, the values usable in the compensation function of Eq. (5) are:

c1=0.005;
c2=0.350;
c3=0.070;
ω1=5.935;
φ1=0.655; and
ω2=0.0664.

As shown in FIG. 9, compensating for the intra-reference-image position error using Eq. (5) enhances the accuracy of the image correlation systems by allowing the correction of, or merely reducing, the intra-reference-image position errors, such as those that might occur due to uncollimated light sources and/or optical distortions, without having to change reference images, for a large displacement between the current reference image and the current displaced image which is over 90 μm in the exemplary embodiment illustrated in FIG. 9.

A third exemplary embodiment of a compensation function that implements the generic compensation function described in Eq. (3) is:

$$e(x)=(c_1+c_2 x)\sin(\omega_1 x+\phi_1)+c_3 \sin((\pi/D)x))+c_4 \sin((\pi/2D)x)+c_5 x \quad (6)$$

where:
c1, c2, c3, c4 and c5 are empirically derived parameters;
ω1 is the spatial frequency of the periodic interpolation error;
φ1 is the spatial phase angle of the periodic interpolation error, used to synchronize the periodic error and the compensation function; and
D is a reference displacement, generally corresponding to the total displacement range of the data used to establish the empirical constants c1–c5.

In general, the empirically-derived parameters c1, c2, c3, c4 and c5 can be determined by observing and/or analyzing the shape of the intra-reference-image position error curve, such as those shown in FIGS. 7–10 for a particular image-correlation based position transducer. It should be appreciated that, in general, the frequency ω1 of the periodic interpolation error is related to 2*π/pixel pitch. In contrast with the exemplary embodiment represented Eq. (5), the term $f_4(x)$ of Eq. (3) has a counterpart in the exemplary embodiment represented by in Eq. (6). That is, Eq. (6) includes a term that compensates for any linear scale factor error that has not previously been eliminated by other means. Furthermore, in contrast with the exemplary embodiment represented by Eq. (5), the term $f_3(x)$ of Eq. (3) has counterpart terms in the exemplary embodiment represented by Eq. (6) that depend on a reference displacement D, rather than a fixed spatial frequency ω2 for updating the reference image. In general, Eq. (6) is valid for displacements slightly greater than D. However, in various exemplary implementations, D represents a maximum displacement that is allowed to occur before the reference image is updated. In such exemplary implementations, the maximum displacement before the reference image is updated typically is up to about three quarters of an imaging frame.

More generally, it should be appreciated that, although trigonometric functions have been conveniently used for the counterpart terms to term $f_3(x)$ of Eq. 3, any function that describes the general curvature of the intra-reference-image position error curve is suitable.

Figure 10:
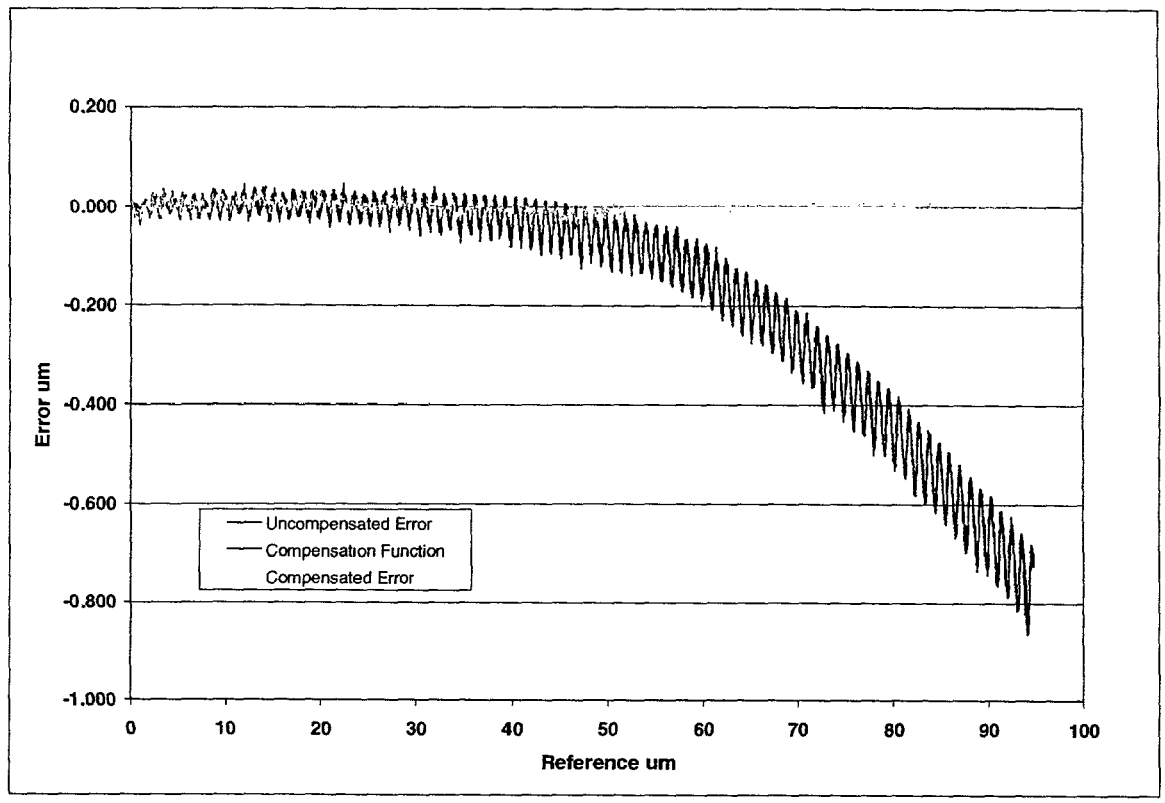
FIG. 10 is a graph illustrating the measured intra-reference-image position error, and the compensated intra-reference-image position error based on a third compensation function, obtained according to one exemplary embodiment of the systems and methods of this invention, for an image correlation measuring system where the reference image is updated at about 95 micrometers of displacement.

FIG. 10 shows a plot of the measured intra-reference-image position error, the compensation values for a corresponding error compensation function, which again are nearly indistinguishable from the measured error, and the resulting compensated intra-reference-image position error. The plots of FIG. 10 include a scale factor error. That is, these plots include an error that is linearly related to displacement. Such an error can arise, for example, if an assumed pixel spacing is not the true pixel spacing. The compensated intra-reference-image position error is obtained by subtracting the value of the compensation function from the measured error for a given displacement. In particular, for an image correlation system having a pixel pitch of about 1.05 micrometer and where the displacement that occurs between the current reference image and the current displaced image when the current reference image is replaced with a new reference image is about 95 micrometers, the values usable in the compensation function of Eq. (6) are:

c1=0.005;
c2=0.00084;
c3=0.35;
c4=0.050;
c5=−0.00835;
ω1=5.984;
φ1=−0.658; and
D=95.

As shown in FIG. 10, compensating for the intra-reference-image position error using Eq. (6) enhances the accuracy of the image correlation systems by allowing the intra-reference-image position errors to be reduced or, ideally, corrected for, without having to change reference images. Such intra-reference-image position errors include those that might occur due to uncollimated light sources and/or optical distortions, for a large displacement between the current reference image and the current displaced image, which is over 90 μm in the exemplary embodiment illustrated in FIG. 10.

It should be appreciated that with respect to the results shown in FIGS. 8–10, the terms related to c1 and c2 in the exemplary embodiments represented by Eqs. (4)–(6) can be omitted from the corresponding error compensation functions in various other exemplary embodiments. Nevertheless, the error due to the general curvature of the intra-reference-image position error curve will still be compensated for the remaining terms of the equations. Such other exemplary embodiments may be appropriate, for example, if the general curvature of the intra-reference-image position error curve is the primary system error. Thus, more generally, in various exemplary embodiments, those terms corresponding, respectively, to the terms $f_1(x)f_2(x)$, $f_3(x)$ and $f_4(x)$ of Eq. (3) may be used separately or in combination to reduce displacement determination errors according to this invention.

Figure 11:
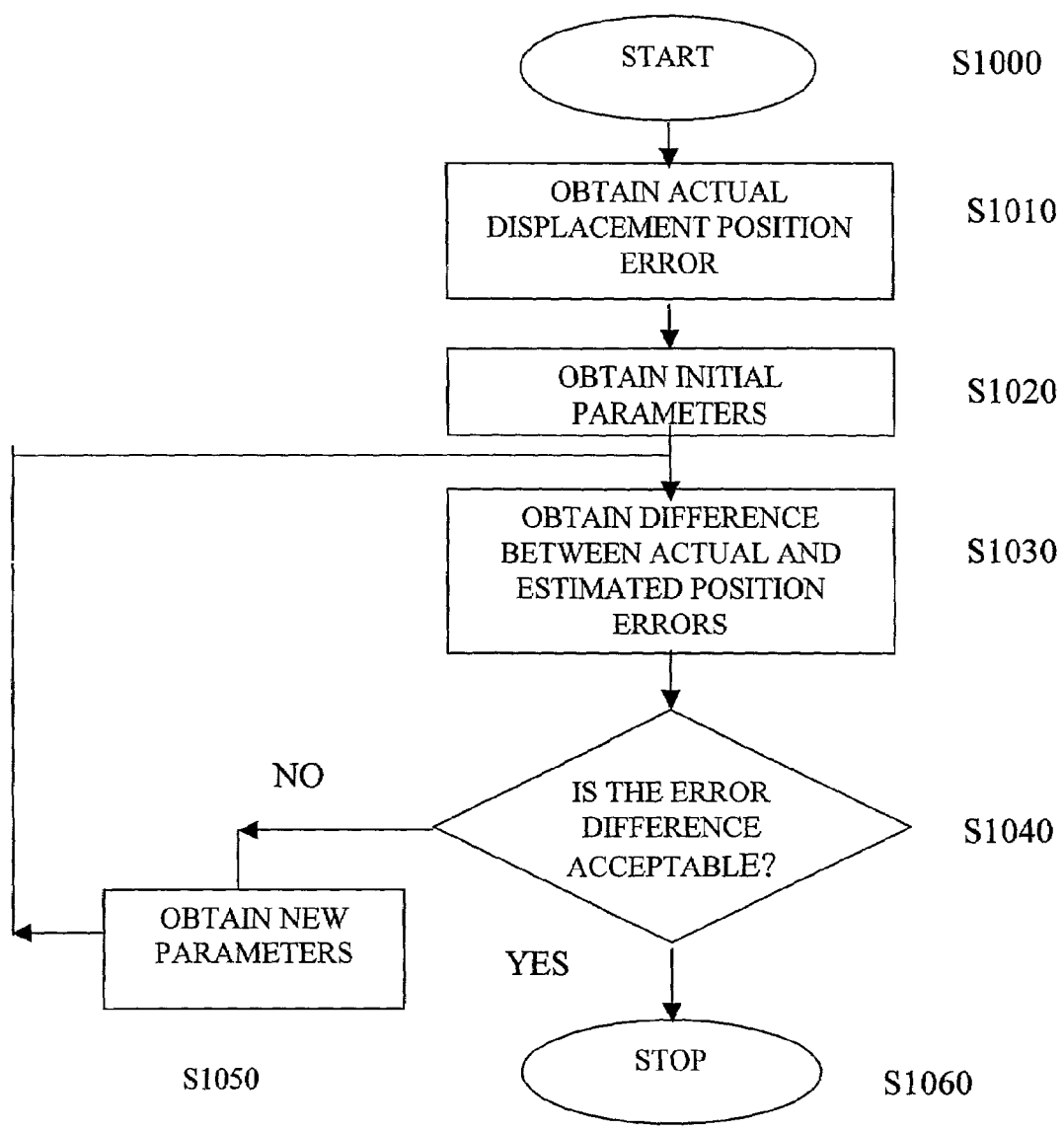
FIG. 11 is a flowchart outlining one exemplary embodiment of a method for obtaining the parameters of a function describing the intra-reference-image position error according to this invention.

FIG. 11 is a flowchart outlining one exemplary embodiment of a method for obtaining the parameters of a function, or an equation, that represents, to some degree of accuracy, the position error in an intra-reference-image displacement according to this invention. Beginning in step S1000, operation continues to S1010, where the "actual" position error in displacements are obtained. The "actual" position error for a displacement is the difference between an "actual" position value for an intra-reference-image displacement and the uncompensated position error in the intra-reference-image displacement.

In various exemplary implementations, the "actual" position value of the current displacement is obtained directly by any known or later-developed displacement measuring method or instrument including, but not limited to, interferometry and the like. Alternatively, in various other exemplary implementations, the relationship between position errors and various physical parameters and system characteristics, such as lens aberration, component alignment parameters, generic decorrelation behavior and the like, is known based on analysis, correlation studies and/or simulation.

In various exemplary implementations, the uncompensated intra-reference-image position value for the current displacement is obtained from an image correlation system that uses any known, or later developed, image correlation method. Obtaining the "actual" position error includes receiving the "actual" position error values (or their constituent parts) that were/are generated by a method not forming part of the exemplary method of practicing this invention. In various other exemplary implementations, obtaining the "actual" position error values includes generating the "actual" position error values (or their constituent parts) as a part of the exemplary method of practicing this invention.

In various exemplary embodiments the "actual" position value of the current displacement is obtained indirectly by measuring or determining the various physical parameters and system characteristics; determining the associated position errors by any known or later-developed method of analysis, correlation and/or simulation and the like, and determining the "actual" position value of the current displacement by combining the determined position errors with the uncompensated intra-reference-image position value for the current displacement.

Next, in step S1020, the initial parameters in the function representing the intra-reference-image position error are obtained or set as the current parameters. In one exemplary implementation, the initial parameters $c_1$, $c_2$, $c_3$, $c_4$—if Eq. (5) is used, $c_5$—if Eq. (6) is used, and $\phi_1$ are set equal to zero, for example, and $\omega_1$, and $\omega_2$ or D, are set equal to the pixel pitch and the distance between reference image updates, respectively. In another exemplary implementation, the initial parameters are set to the parameters corresponding to a correlation system whose design parameters are close to, but not necessarily the same as, the design parameters of the correlation system being characterized.

Then, in step S1030, the difference between the "actual" position error, as obtained in step S1010, and the estimated position error for an intra-reference-image displacement based on the current parameters is obtained. That is, the position error estimating equation is used to obtain the estimate of the position error in the intra-reference-image displacement based on the current parameters. Alternatively, in a variation of step S1030, in various exemplary embodiments, the determined position errors are used directly as the estimated position errors.

Next, in step S1040, a determination is made whether the difference between the "actual" position error and the estimated position error is acceptable. If the difference error is acceptable, then operation proceeds to step S1060, where the method stops.

In contrast, if the difference between the "actual" position error and the estimated position error is unacceptable, then operation proceeds to step S1050, wherein new parameters are obtained as the current parameters. In one exemplary implementation, the parameters $c_1$, $c_2$, and $c_3$, $c_4$—if Eq. (5) is used, $c_5$—if Eq. (6) is used, and $\phi_1$ are varied, while $\omega_1$ and $\omega_2$ or D are kept constant.

In another exemplary implementation, the parameters $c_1$, $c_2$, and $c_3$, $c_4$—if Eq. (5) is used, $c_5$—if Eq. (6) is used, $\phi_1$, $\omega_1$, and $\omega_2$ or D are varied while making the variations in $\omega_1$ and $\omega_2$ or D relatively small compared to the variations in the parameters $c_1$, $c_2$, and $c_3$, $c_4$—if Eq. (5) is used and $c_5$—if Eq. (6) is used, and $\phi_1$. In yet another exemplary implementation, combinations of the parameters $c_1$, $c_2$, and $c_3$, $c_4$—if Eq. (5) is used, $c_5$—if Eq. (6) is used, $\phi_1$, $\omega_1$ and $\omega_2$ or D are varied at different relative amounts. In yet another exemplary implementation, one or more of these parameters are varied differently based on the displacement from the reference image. Next, the operation returns to step S1030 to obtain the difference between the "actual" position error and an estimate of the position error based on the new current parameters. The loop around steps S1030–S1050 continues until the difference between the "actual" and estimated "position errors is deemed acceptable.

Changing the parameters to effectuate obtaining an acceptable estimated position error is achieved by any known, or later developed, procedure including, but not limited to, fitting based on user provided criteria and/or fitting based on minimizing the difference between the estimated position error provided by the estimating equation and the difference between the "actual" position value and the uncompensated position of the intra-reference-image displacements.

In various exemplary implementations, the "actual" displacement value and the uncompensated position value for a large number of displacements are previously obtained and are provided prior to performing the actual displacement position error obtaining of step S1010. In other various exemplary implementations, the "actual" displacement value and the uncompensated position value for the current displacement are obtained in real time as part of step S1010, which are then used to obtain the "actual" position error. In various other exemplary implementations, the difference between the "actual" position values and the uncompensated position value of intra-reference-image dislocations (that is the "actual" position errors) are predetermined and stored, and thus are merely provided in step S1010.

In the method outlined in FIG. 11, in various exemplary implementations, the difference between the "actual" position error and the estimated position error may be determined to be acceptable based on a user's choice including, but not limited to, fitting a determined position of a displacement to a reference position. Alternatively, in various other exemplary implementations, the error may be determined to be acceptable based on minimizing the total accumulated error or the total average error, the total peak-to-peak error or the like. Alternatively, in various other exemplary implementations, the error may be determined to be acceptable based on minimizing the accumulated error in a specific range of displacements that is a sub-region of a greater range of displacements without switching the reference image.

In the method outlined in FIG. 11, in various exemplary implementations, the error may be determined to be acceptable based on obtaining a set of parameters that applies throughout a range of displacements without switching a reference image. Alternatively, in various other exemplary implementations, the error may be determined to be acceptable based on segmenting the range of displacements, when a reference image is not switched, into plural sub-segments wherein at least one parameter has different values for at least some of the sub-ranges.

It should be appreciated that, once the intra-reference-image position error characteristics have been specifically determined for a particular image correlation-based displacement measuring system, these intra-reference-image position error characteristics provide a basis for specifically compensating for or reducing these intra-reference-image position errors during subsequent operation of that particular image correlation-based displacement measuring system.

However, in addition, the intra-reference-image position error characteristics may be relatively similar for a plurality of similar image correlation-based displacement measuring systems. Thus, to the extent that a particular image correlation-based displacement measuring system is representative of a class of similar image correlation-based displacement measuring systems, the intra-reference-image position error of any machine in that class may be similarly compensated for or reduced, to some extent, based on the predetermined intra-reference-image position error characteristics of the particular representative image correlation-based displacement measuring system.

Figure 12:
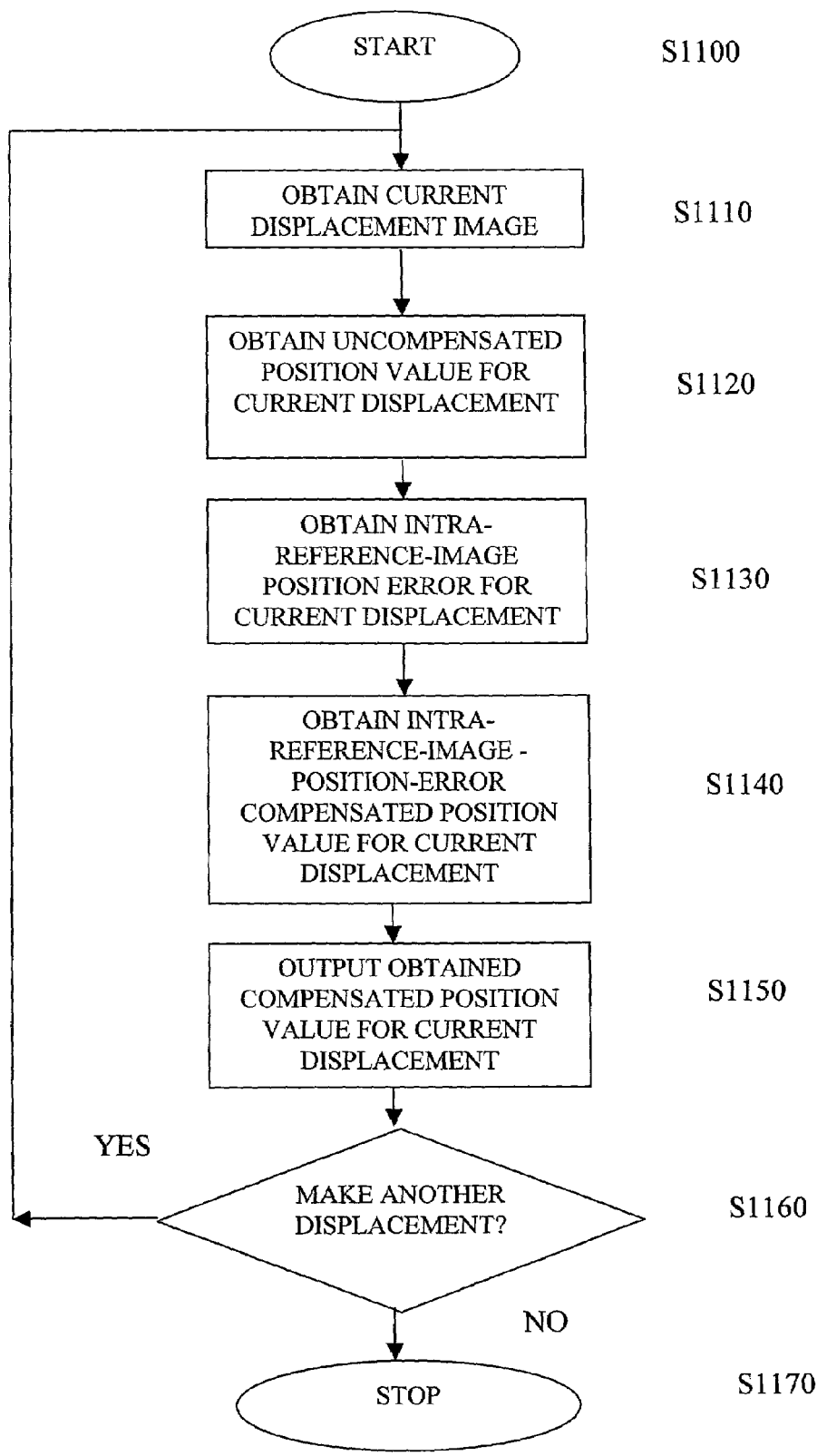
FIG. 12 is a flowchart outlining one exemplary method for compensating a displacement position measurement to reduce the intra-reference-image position errors in the measured displacement position, based on a predetermined function that describes the intra-reference-image position error.

FIG. 12 is a flowchart outlining one exemplary embodiment of a method for compensating a displacement position measurement to reduce the intra-reference-image position errors in the displacement position measurement, based on a predetermined function that describes the position error. Beginning in step S1100, operation continues to step S1110, where a current displaced image is input. Then, in step S1120, an uncompensated displacement position value for the current displaced image relative to the current reference image is determined. This initial displacement value can be determined using any known or later-developed technique, such as those techniques disclosed in the incorporated 071, 636 and 889 applications. Next, in step S1130, the intra-reference-image position error for the obtained initial displacement value is determined based on a predetermined intra-reference-image error function, such as Eqs. 3–6 outlined above, and the corresponding predetermined parameter values for that function. Operation then continues to step S1140.

In step S1140, the intra-reference-image position error determined in step S1130 is combined with the uncompensated displacement value to generate a compensated position value for the intra-reference-image displacement. Then, in step S1150, the compensated position value is output to a display device and/or made available to a downstream process as the estimated compensated position of the intra-reference-image displacement between the current reference image and the current displaced image. In step S1160, a determination is made whether another displaced image is to be obtained. If so, then operation returns to step S1110. Otherwise, operation continues to step S1170, where the method stops.

It should be appreciated, that although the previously discussed operations of the exemplary embodiments of FIGS. 11 and 12 have captured the information necessary to compensate for the intra-reference-image position errors in the form of a mathematical function of displacement relative to a reference image position, and applied that mathematical function to compensate the errors, in various other exemplary embodiments, the information may be captured and/or applied in any other known or later-developed form, such as a look-up table or the like.

In various exemplary embodiments that use a look-up table, actual displacement position errors are obtained according to the operations of step S1010 described with reference to FIG. 11. The actual displacement errors are stored in an intra-reference-image error look-up table and associated with their appropriate respective displacement positions. The operations of steps S1100–S1170 are then performed, as described with respect to FIG. 12, except that the operation of step S1130 modified according to the present exemplary implementation. It should be appreciated that step S1130 of FIG. 12 obtains an intra-reference-image position error for the obtained initial displacement value.

However, in the previously described exemplary implementation of the method of FIG. 12, the intra-reference-image position error was determined based on a predetermined intra-reference-image error function. In contrast, in the present exemplary embodiment, the intra-reference-image position error is determined based on the predetermined intra-reference-image error look-up table.

In various exemplary implementations, the intra-reference-image error look-up table includes data corresponding to displacement steps of $1/20$ of the spatial frequency of the previously discussed periodic interpolation error. The look-up table error value corresponding to the look-up table displacement value closest to the obtained initial displacement value is used as the current intra-reference-image position error. In various other exemplary implementations, the current intra-reference-image position error is determined as an interpolated value between the two the look-up table error values corresponding to the look-up table displacement values bounding the obtained initial displacement value. The interpolated value is determined between the two the look-up table error values based on the relationship between the bounding look-up table displacement values and the obtained initial displacement value, according to known methods. Various alternative implementations using various other displacement steps in the look-up table, and/or combining mathematical functions corresponding to the intra-reference-image position error over various ranges with various alternative interpolation methods, will be apparent to one skilled in the art.

Figure 13:
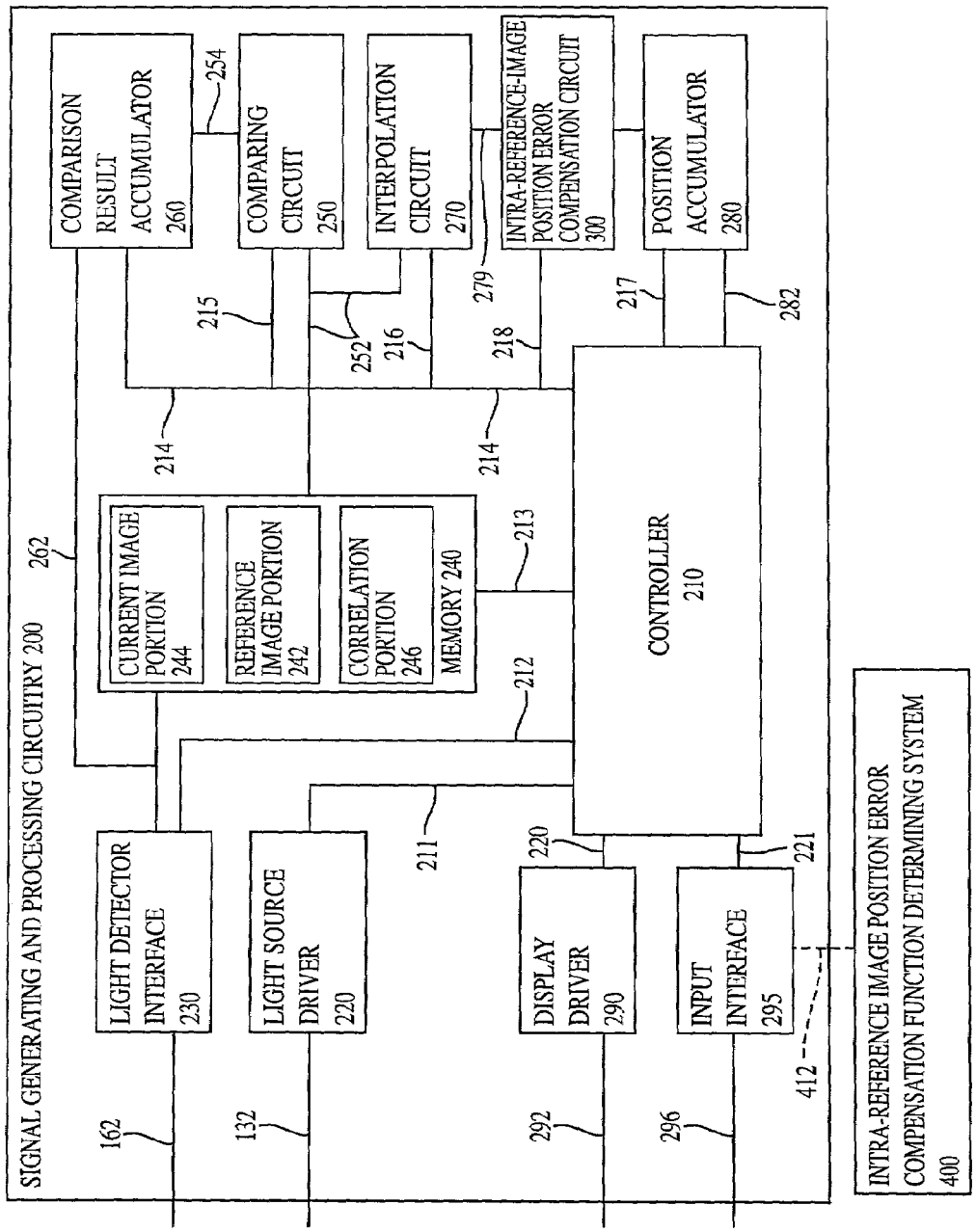
FIG. 13 is a block diagram outlining in greater detail one exemplary embodiment of the signal generating and processing circuitry of the speckle-image-correlation optical position transducer of FIG. 1 according to this invention.

FIG. 13 is a block diagram outlining one exemplary embodiment of the signal generating and processing circuitry 200 that implements one exemplary embodiment of the systems and methods according to this invention. As shown in FIG. 13, the signal generating and processing circuitry 200 includes a controller 210, a light source driver 220, a light detector interface 230, a memory 240, a comparing circuit 250, a comparison result accumulator 260, an interpolation circuit 270, an intra-reference-image position error compensation circuit 300, a position accumulator 280, a display driver 290 and an optional input interface 295.

The controller 210 is connected to the light source driver 220 by a control line 211, to the image detector interface 230 by a signal line 212, and to the memory 240 by a signal line 213. Similarly, the controller 210 is connected by one or more of the signal lines 214-219 to the comparing circuit 250, the comparison result accumulator 260, the interpolation circuit 270, the intra-reference-image compensation circuit 300 and the position accumulator 280. Finally, the controller 210 is connected to the display driver 290 by a control line 220 and, if provided, to the input interface 295 by an input signal line 221. The memory 240 includes a first, or reference, image portion 242, a second, or subsequent, image portion 244 and a correlation portion 246.

In operation, the controller 210 outputs a control signal over the signal line 211 to the light source driver 220. In response, the light source driver 220 outputs a drive signal to the light source 130 over the signal line 132. Subsequently, the controller 210 outputs a control signal to the image detector interface 230 and to the memory 240 over the signal lines 212 and 212 to store the signal portions received over the signal line 164 from the light detector 160 corresponding to each of the image elements 162 into the first, or reference, image portion 242 or the second, or subsequent, image portion 244. In particular, the image values from the individual image elements 162 are stored in a two-dimensional array in the first image portion 242 and the second image portion 244 corresponding to the positions of the individual image elements 162 in the array 166.

Once a first image is stored in the first image portion 242, the controller 210 waits the predetermined short time period to again output the control signal on the signal line 211 to the light source driver 220 to again drive the light source 130. The image detector interface 230 and the memory 240 are then controlled using signals on the signal lines 212 and 212 to store the resulting image in the second image portion 244.

Then, the controller 210 outputs a signal on the signal line 215 to the comparing circuit 250. In response, the comparing circuit 250 inputs an image value for a particular pixel from the first image portion 242 over a signal line 252 and inputs the image value for the corresponding pixel, based on the current offset, from the second image portion 244 over the signal line 252. The comparing circuit 250 then applies a correlation algorithm to determine a comparison result. Any appropriate correlation technique, known or later-developed, can be used by the comparing circuit 250 to compare the first image stored in the first image portion 242 with the second image stored in the second image portion 244 on a pixel-by-pixel basis based on the current offset. The comparing circuit 250 outputs the comparison result on a signal line 254 to the comparison result accumulator 260 for the current correlation offset.

Once the comparing circuit 250 has extracted and compared the image value for each of the image elements 162 from the first image portion 242 and compared them to the corresponding image value stored in the second image portion 244, and applied the correlation technique and output the comparison result to the comparison result accumulator 260, the value stored in the comparison result accumulator 260 defines the correlation value, corresponding to the current offset, in predetermined units, as exemplified in FIG. 7. The controller 210 then outputs a signal over the signal line 214 to the comparison result accumulator 260 and to the memory 240 over the signal line 213. As a result, the correlation algorithm result stored in the comparison result accumulator 260 is output and stored in the correlation portion 246 of the memory 240 at a location corresponding to the current offset.

The controller 210 then outputs a signal on the signal line 214 to clear the result accumulator 260. Once all of the comparisons for all of the desired offsets between the first image stored in the first image portion 242 and the second image stored in the second image portion 244 have been performed by the comparing circuit 250, and the results accumulated by the comparison result accumulator 260 and stored in the correlation portion 246 under control of the controller 210, the controller 210 outputs a control signal over the signal line 216 to the interpolation circuit 270.

In response, the interpolation circuit 270 inputs the correlation results stored in the correlation portion 246 over the signal line 252, and identifies correlation values coinciding with a peak or trough of the correlation function and interpolates using selected correlation function value points in the vicinity of the peak/trough of the correlation function to determine the peak offset value or image displacement value with sub-pixel resolution. The interpolation circuit 270 then outputs, under control of the signal over the signal line 216 from the controller 210, the determined estimated sub-pixel displacement value on a signal line 279 to the intra-reference-image position error compensation circuit 300.

The intra-reference-image position error compensation circuit 300, under control of a signal from the controller 210 on a signal line 218, applies a predetermined intra-reference-image error compensation function to the determined estimated sub-pixel displacement value received on the signal line 279 to generate a compensated estimated sub-pixel displacement value. This compensated estimated sub-pixel displacement value is output over a signal line 302 to the position accumulator 280. The position accumulator 280, under control of the signal over the signal line 217 from the controller 210, adds the compensated estimated displacement value to an accumulated displacement stored in the position accumulator 280. The position accumulator 280 then outputs the updated position displacement to the controller 210 over the signal line 282.

In response, the controller 210 may output the updated displacement value to the display driver 290, if provided, over the signal line 220. The display driver 290 then outputs drive signals over the signal line 292 to a display device (not shown) to display the current displacement value.

One or more signal lines 296, if provided, allow an interface between an operator or a cooperating system and the controller 210. If provided, the input interface 295 may buffer or transform the input signals or commands and transmit the appropriate signal to the controller 210. The input interface 295 can also be detachably connected over a link 412 to an intra-reference-image position error compensation function determining system 400, described further below.

Figure 14:
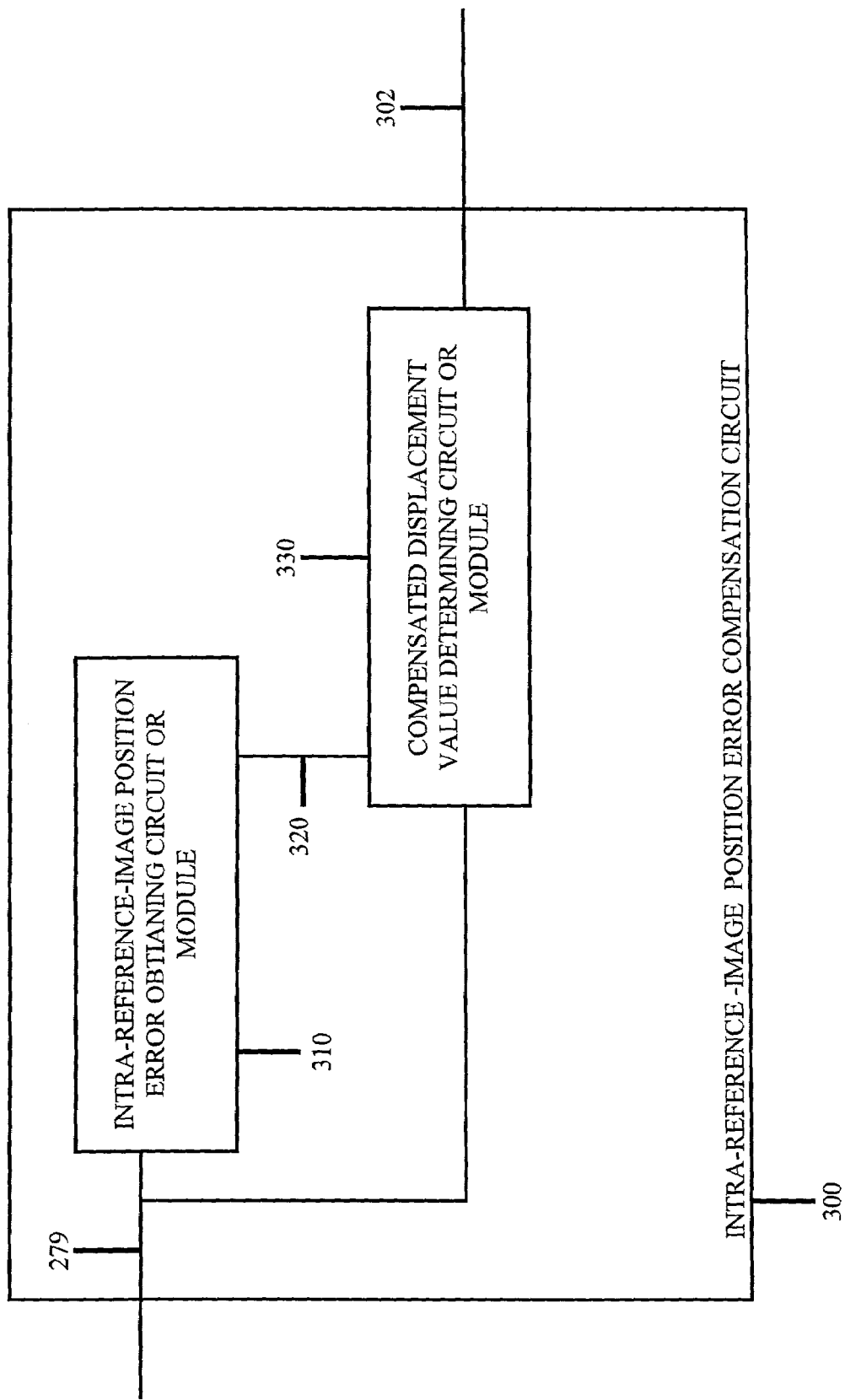
FIG. 14 is a block diagram outlining in greater detail one exemplary embodiment of the intra-reference-image error compensation determining circuit or routine usable with the signal generating and processing circuitry of FIG. 13 according to this invention.

FIG. 14 is a block diagram outlining in greater detail one exemplary implementation of the intra-reference-image position error compensation circuit 300, that estimates the position error for the intra-reference-image current displacement. As shown in FIG. 13, the intra-reference-image position error compensation circuit 300 includes an intra-reference-image-position error obtaining circuit or module 310, a compensated displacement value determining circuit or module 330, and a signal line 320 operatively connecting the intra-reference-image position error obtaining circuit or module 310 with the compensated displacement value determining circuit or module 330.

In operation, the intra-reference-image-position error obtaining circuit or module 310 inputs the current uncompensated estimated displacement value from the interpolation circuit 270 over the signal line 279 and obtains the intra-reference-image position error for the received current uncompensated displacement value wherein the parameters have already been obtained. In various other exemplary implementation, other equations, different than Eqs. (4) and (5) but fitting the intra-image-reference position error, are used to obtain the intra-reference-image position error for the current uncompensated estimated sub-pixel displacement value. The intra-reference-image position error obtaining circuit 310 obtains an intra-reference-image position error for the current displacement based on the predetermined error function and the received uncompensated estimated sub-pixel displacement value and outputs the obtained intra-reference-image position error to the compensated displacement value determining circuit or module 330 over the signal line 320.

The compensated displacement value determining circuit 330 inputs the uncompensated estimated sub-pixel displacement value from the interpolation circuit 270 over the signal line 279 and the intra-reference-image position error for the uncompensated displacement value over the signal line 320. The compensated displacement value determining circuit or module 330 combines the uncompensated estimated sub-pixel displacement value and the intra-reference-image position error to generate the compensated estimated sub-pixel displacement value. The compensated displacement value determining circuit or module 330 outputs the determined compensated estimated sub-pixel displacement value over the signal line 302 to the position accumulation 280.

Figure 15:
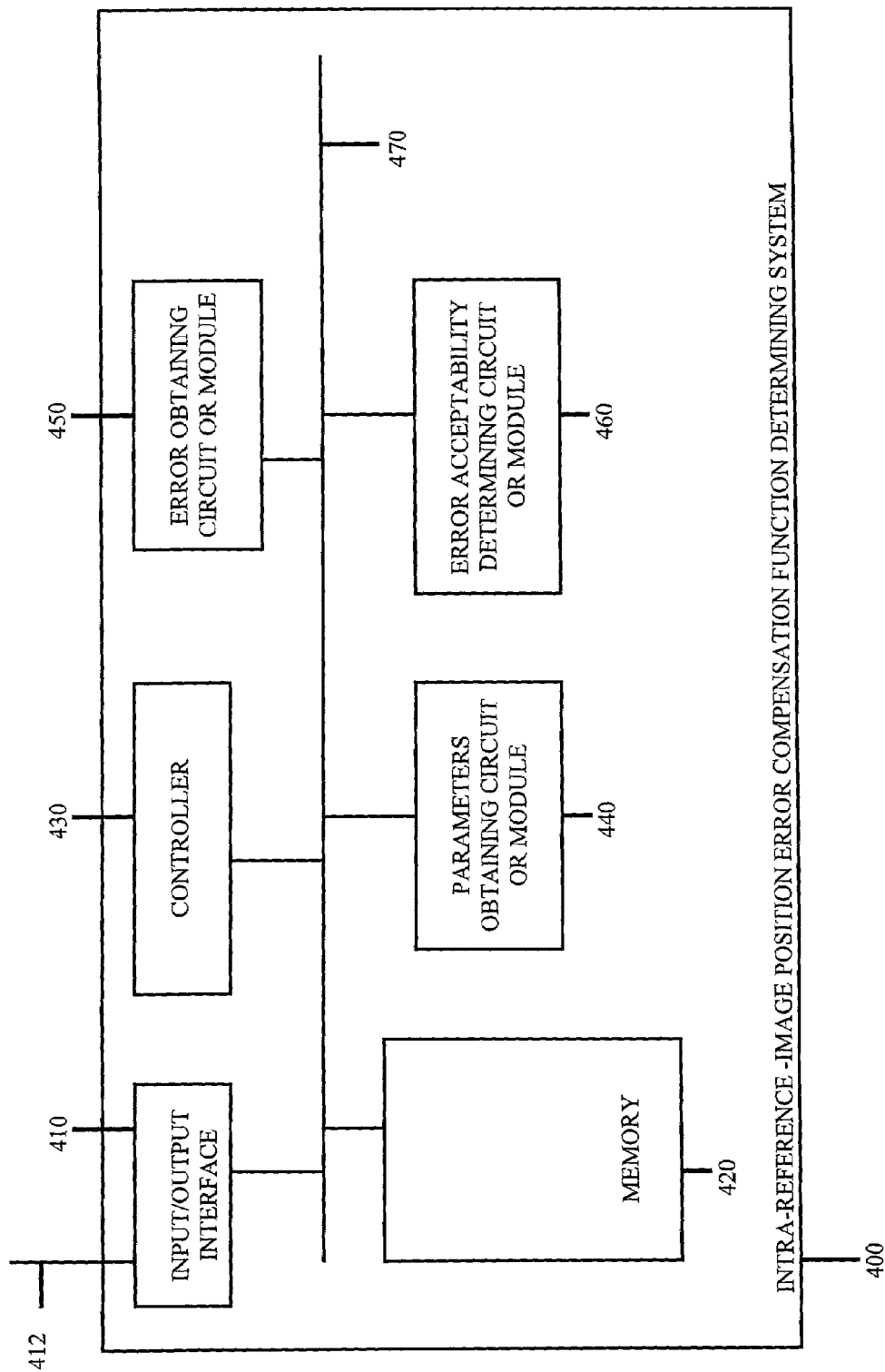
FIG. 15 is a block diagram outlining in greater detail one exemplary embodiment of the intra-reference-image error compensating circuit or routine usable with according to this invention.

FIG. 15 is a block diagram illustrating in greater detail one exemplary embodiment of the intra-reference-image position error compensation function determining system 400. As shown in FIG. 15, the intra-reference-image position error compensation function determining system 400 can be detachably connected to the input interface 295 over a link 412. The controller 210, during a set-up operation when the intra-reference-image position error compensation function determining system 400 is attached to the input interface 295, can supply the raw, uncompensated sub-pixel displacement values from the interpolation circuit 270 to the intra-reference-image error compensation function determining system 400 over the link 412. The intra-reference-image error compensation function determining system 400 uses the uncompensated estimated sub-pixel displacement values and corresponding measurements of the actual sub-pixel displacement value to generate an intra-reference-image position error curve like those shown in FIGS. 7–10. The intra-reference-image error compensation function determining system 400 then determines and outputs the intra-reference-image error compensation function to the controller 210 through the input interface 295 and over the link 412. The controller 210 then supplies the intra-reference-image error compensation function to the intra-reference-image position error compensation circuit 300 to set up the intra-reference-image error compensation function circuit 300 so it is usable during a run mode to convert the uncompensated estimated displacement values to compensated estimated displacement values.

As shown in FIG. 15, the intra-reference-image position error compensation function determining system 400 includes an input/output interface 410, a memory 420, a controller 430, a parameter obtaining circuit or module 440, an error obtaining circuit or module 450, and an error acceptability determining circuit or module 460 each connected to a control/data bus 470. The controller 430 controls the operation of the various components forming the intra-reference-image position error compensation function determining system 400 and processes data. The memory 420 provides the necessary storage space for storing parameters necessary for, and intermediate and final results obtained from, the processing performed by the various components of the intra-reference-image position error compensation function determining system 400. The input/output interface is connectable to at least the link 412 to the signal generating and processing circuitry 200, as well as allowing inputs from any connected user input devices and/or outputs to any connected user output devices.

In operation, the parameter obtaining circuit or module 440 obtains—generates or receives, and sets, the initial parameters for the function used to estimate the intra-reference-image position error for the current displacement. For example, the initial parameters may be set to zero. Alternatively, the initial parameters may be set to values of parameters of systems having different component dimensions. The obtained initial parameters are provided to the error obtaining circuit or module 450.

Based on the obtained initial parameters, the error obtaining circuit or module 450, using an equation estimating the position error, obtains an estimate of the intra-reference-image position error for the current displacement. The obtained estimate of the position error of the intra-reference-image displacement is provided to the error acceptability determining circuit or module 460.

Based on the provided or determined position error in the intra-reference-image displacement, the error acceptability determining circuit or module 460 determines whether the residual position error is acceptable. In making this determination, the error acceptability determining circuit or module 460 has access, in various exemplary embodiments, to the difference between the "actual" position value of the current displacement and the uncompensated position of the intra-reference-image of the current displacement. In various exemplary implementations, the "actual" position value of the current displacement is obtained by any known or later-developed displacement determining system or instrument including, but not limited to, interferometry and the like, which yields a measurement of the displacement to a resolution at least as high as the resolution of the image correlation system. In various exemplary implementations, the uncompensated intra-reference-image position value for the current displacement is obtained by any known, or later developed, image correlation system.

In various exemplary implementations, the error acceptability determining circuit or module 460 compares the value of equation estimating the position error of the current intra-reference-image displacement with the difference between the "actual" position value and the uncompensated position value of the current intra-image-reference-image displacement to determine whether the estimated position error is acceptable. If the estimated position error is accepted, based on one or more user-provided criteria, for example, then the error acceptability determining circuit or module 460 outputs a signal indicating that the parameters of the equation used to estimate the position error in an intra-reference-image displacement are acceptable. If the estimated position error is not accepted, then the error acceptability determining circuit or module 460 outputs a signal indicating that the parameters of the equation used to estimate the position error in an intra-reference-image displacement should be revised.

In various implementations, the controller 430 affects the revisions to the parameters of the equation estimating the position error in a manner leading to accepting the estimated position error. In other exemplary implementations, the parameter obtaining circuit or module 440 affects the revisions to the parameters of the equation estimating the position error in a manner leading to accepting the estimated position error. Changing or revising the parameters to effectuate the accepting of the estimated position error is achieved by any known, or later developed, procedure including, but not limited to, fitting based on user provided criteria and/or fitting based on minimizing the difference between the estimated position error provided by the estimating equation and the difference between the "actual" position value and the uncompensated position of the intra-reference-image displacements.

In one exemplary implementation, the parameters $c_1$, $c_2$, $c_3$, $c_4$—if Eq. (5) is used, $c_5$—if Eq. (6) is used, and $\phi_1$ are varied, while $\omega_1$, and $\omega_2$ or D are kept constant. In yet another exemplary implementation, the parameters $c_1$, $c_2$, $c_3$, $c_4$—if Eq. (5) is used, $c_5$—if Eq. (6) is used, $\phi_1$, $\omega_1$, and $\omega_2$ or D are varied while making the variations in $\omega_1$ and $\omega_2$ or D relatively small compared to the variations in the parameters $c_1$, $c_2$, $c_3$, $c_4$—if Eq. (5) is used, $c_5$—if Eq. (6) is used, and $\phi_1$. In yet another exemplary implementation, combinations of the parameters $c_1$, $c_2$, $c_3$, $c_4$—if Eq. (5) is used, $c_5$—if Eq. (6) is used, $\phi_1$, $\omega_1$, and $\omega_2$ or D are varied at different relative amounts. In yet another exemplary implementation, one or more of these parameters are varied differently based on the displacement from the reference image.

In various exemplary implementations, the "actual" displacement value and the uncompensated position value for a large number of displacements are previously obtained and are provided to the intra-reference-image position error compensation function determining system 400 through the I/O 410. In other various exemplary implementations, the "actual" displacement value and the uncompensated position value for the current displacement are obtained in real time. In other various exemplary implementations, the "actual" position values and the uncompensated position value of intra-reference-image dislocations are provided to the error obtaining circuit or module 450, which then obtains the difference between the "actual" and uncompensated position values.

In various exemplary implementation, a combination including at least the system 400 and various components of the circuit 200 may be used to characterize a correlation imaging system having specific optical design parameters. Thus permitting the mass production of many correlation imaging systems having the characterized optical design parameters.

The signal generating and processing system 200 and the intra-reference-image position error compensation function determining system 400 are, in various exemplary embodiments, each implemented on a programmed general purpose computer. However, the signal generating and processing system 200 and the intra-reference-image position error compensation function determining system 400 can each also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 11 and 12, can be used to implement the signal generating and processing system 200 and the intra-reference-image position error compensation function determining system 400, respectively.

It should be understood that each of the circuits, modules, or routines shown in FIGS. 11–15 can be implemented as portions of a suitably programmed general purpose computer. Alternatively, each of the circuits, modules, or routines shown in FIGS. 11–15 can be implemented as physically distinct hardware circuits within an ASIC, or using a FPGA, a PDL, a PLA, a PAL or a digital signal processor, or using discrete logic elements or discrete circuit elements. The particular form each of the circuits, modules, or routines shown in FIGS. 11–15 will take is a design choice and will be obvious and predicable to those skilled in the art.

For example, the modules can be implemented as carrier waves carrying control instructions for performing the steps shown in FIGS. 11 and 12 and the segments of this disclosure describing in more detail the various exemplary implementations. Also, the signal generating and processing system 200 and the intra-reference-image position error compensation function determining system 400 can each be integrated into a single image correlation system that obtains the error measure (i.e., the function) describing the position error and applies it to obtain the error-reduced displacement position. Various exemplary implementations may be rendered more compact by avoiding redundancies in constituent circuits; for example, by having one memory circuit or module or one controller circuit or module. Various other exemplary implementations may retain redundancies to enable parallel processing, for example.

This invention has been described in various exemplary embodiments including speckle-image processing, wherein the displacement determination based on the speckle images is improved. However, it should be appreciated that the determination of displacement based on conventionally-acquired images may also be improved by systems and methods according to the this invention. In particular, when the conventionally-acquired images are somewhat predictable or controlled and contain a large amount of information at high spatial frequencies, the related displacement determinations according to this invention will be significantly improved relative to conventional practices.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method usable to reduce displacement errors in an image-correlation-based displacement measuring system, comprising:
    determining an estimate of an error amount corresponding to an uncompensated displacement value, the uncompensated displacement value representing a displacement between a reference image and a displaced image, wherein the estimate of the error amount includes an intra-reference-image error and is represented in the image-correlation-based displacement measuring system in relation to a displacement relative to an arbitrary reference image position, wherein the displacement relative to an arbitrary reference image position cover a range which is a significant portion of the maximum displacement range usable with a single reference image in the image-correlation-based displacement measuring system.

2. The method according to claim 1, further comprising generating the uncompensated displacement value based on a reference image and a displaced image.

3. The method according to claim 1, further comprising combining the estimated error amount and the uncompensated displacement value to determine a compensated displacement between the reference image and the displaced image.

4. The method according to claim 1, wherein:
    the estimate of the error amount is one of a plurality of error estimates represented in the image-correlation-based displacement measuring system in relation to displacements relative to an arbitrary reference image position.

5. The method according to claim 1, wherein the estimate of the error amount is represented in a form comprising a look-up table.

6. The method according to claim 5, wherein the estimate of the error amount is represented in a form comprising a value based on interpolation between values represented in the look-up table.

7. The method according to claim 1, wherein:
    the estimate of the error amount is represented in a form comprising an error function representing the errors observed in the uncompensated displacement values determined by the image-correlation-based displacement measuring system over a significant portion of a maximum displacement range usable with a single reference image in the image-correlation-based displacement measuring system; and the error function includes at least a component related to a general curvature of the observed errors, the general curvature extending over a significant portion of the maximum displacement range usable with a single reference image in the image-correlation-based displacement measuring system.

8. The method according to claim 7, further comprising fitting the error function to a difference between reference values and uncompensated displacement values, wherein the reference values represent displacements between the reference image and displaced images, and wherein the uncompensated displacement values represent displacements between the reference image and the displaced images.

9. The method according to claim 8, further comprising minimizing the difference between the error function and the reference values.

10. The method according to claim 7, wherein the error function includes a first periodic component related to a periodic image-correlation interpolation error.

11. The method according to claim 10, wherein the error function includes a second component which modifies the amplitude of the first periodic component over a range which is a significant portion of the maximum displacement range usable with a single reference image in the image-correlation-based displacement measuring system.

12. An apparatus usable to reduce displacement errors in an image-correlation-based displacement measuring system, comprising:

a module determining an estimate of an error amount corresponding to an uncompensated displacement value, the uncompensated displacement value representing a displacement between a reference image and a displaced image, wherein the estimate of the error amount includes an intra-reference-image error and is represented in the module in relation to a displacement relative to an arbitrary reference image position, wherein the displacement relative to an arorbitrary reference image position cover a range which is a significant portion of the maximum displacement range usable with a single reference image in the image-correlation-based displacement measuring system.

13. The apparatus according to claim 12, further comprising a module generating the uncompensated displacement value based on a reference image and a displaced image.

14. The apparatus according to claim 12, further comprising a module combining the estimated error amount and the uncompensated displacement value to determine a compensated displacement between the reference image and the displaced image.

15. The apparatus according to claim 12, wherein:
the estimate of the error amount is one of a plurality of error estimates represented in the module in relation to displacements relative to an arbitrary reference image position.

16. The apparatus according to claim 12, wherein the estimate of the error amount is represented in a form comprising a look-up table.

17. The apparatus according to claim 16, wherein the estimate of the error amount is represented in a form comprising a value based on interpolation between values represented in the look-up table.

18. The apparatus according to claim 12, wherein:
the estimate of the error amount is represented in a form comprising an error function representing the errors observed in the uncompensated displacement values determined by the image-correlation-based displacement measuring system over a significant portion of a maximum displacement range usable with a single reference image in the image-correlation-based displacement measuring system; and the error function includes at least a component related to a general curvature of the observed errors, the general curvature extending over a significant portion of the maximum displacement range usable with a single reference image in the image-correlation-based displacement measuring system.

19. The apparatus according to claim 18, further comprising a module fitting the error function to a difference between reference values and uncompensated displacement values, the reference values represent displacements between the reference image and displaced images, and wherein the uncompensated displacement values represent displacements between the reference image and the displaced images.

20. The apparatus according to claim 19, further comprising a module that minimizes the difference between the error function and the reference values.

21. The apparatus according to claim 18, wherein the error function includes a first periodic component related to a periodic image-correlation interpolation error.

22. The apparatus according to claim 21, wherein the error function includes a second component which modifies the amplitude of the first periodic component over a range which is a significant portion of the maximum displacement range usable with a single reference image in the image-correlation-based displacement measuring system.

23. The apparatus according to claim 12, wherein the apparatus is a computer readable medium and wherein the module is control program stored on the computer readable medium.

24. A carrier wave encoded to transmit a control program to a device capable of executing the control program, the control program usable to reduce displacement errors in an image-correlation-based displacement measuring system, the control program comprising:

instructions for determining an estimate of an error amount corresponding to an uncompensated displacement value, the uncompensated displacement value representing a displacement between a reference image and a displaced image, wherein the estimate of the error amount includes an intra-reference-image error and is represented in one of the control program and the image-correlation-based displacement measuring system in relation to a displacement relative to an arbitrary reference image position, wherein the displacement relative to an arbitrary reference image position cover a range which is a significant portion of the maximum displacement range usable with a single reference image in the image-correlation-based displacement measuring system.

25. The method according to claim 1, wherein the intra-reference-image error includes position errors due to uncollimated light sources or optical distortions.

26. The method according to claim 1, wherein the intra-reference-image error includes errors that are characteristic of the image-correlation-based displacement measuring system.

27. The apparatus according to claim 12, wherein the intra-reference-image error includes position errors due to uncollimated light sources or optical distortions.

28. The apparatus according to claim 12, wherein the intra-reference-image error includes errors that are characteristic of the image-correlation-based displacement measuring system.

29. The carrier wave according to claim 24, wherein the intra-reference-image error includes position errors due to uncollimated light sources or optical distortions.

30. The carrier wave according to claim 24, wherein the intra-reference-image error includes errors that are characteristic of the image-correlation-based displacement measuring system.

* * * * *